United States Patent
Fraser et al.

(10) Patent No.: US 12,054,401 B2
(45) Date of Patent: *Aug. 6, 2024

(54) PROCESS AND METHOD FOR PRODUCING CRYSTALLIZED METAL SULFATES

(71) Applicants: Hatch Ltd., Mississauga (CA); Northvolt AB, Stockholm (SE)

(72) Inventors: Robert John Fraser, Ontario (CA); Evangelos Stamatiou, Ontario (CA); Mark Joseph Machado, Ontario (CA); Henry Christian Immo von Schroeter, Ontario (CA); Mahmood Alemrajabi, Stockholm (SE)

(73) Assignees: Northvolt AB, Stockholm (SE); Hatch Ltd., Mississauga (CA)

( * ) Notice: Subject to any disclaimer, the term of this patent is extended or adjusted under 35 U.S.C. 154(b) by 463 days.

This patent is subject to a terminal disclaimer.

(21) Appl. No.: 17/222,264

(22) Filed: Apr. 5, 2021

(65) Prior Publication Data
US 2022/0009793 A1    Jan. 13, 2022

Related U.S. Application Data

(63) Continuation of application No. 17/066,769, filed on Oct. 9, 2020, now Pat. No. 10,995,014.

(60) Provisional application No. 63/050,191, filed on Jul. 10, 2020.

(51) Int. Cl.
| | |
|---|---|
| C01G 53/10 | (2006.01) |
| C01G 45/10 | (2006.01) |
| C01G 51/10 | (2006.01) |
| C22B 3/00 | (2006.01) |
| C22B 7/00 | (2006.01) |
| C22B 26/12 | (2006.01) |
| H01M 10/0525 | (2010.01) |
| H01M 10/54 | (2006.01) |

(52) U.S. Cl.
CPC ............ *C01G 53/10* (2013.01); *C01G 45/10* (2013.01); *C01G 51/10* (2013.01); *C22B 7/007* (2013.01); *C22B 23/0415* (2013.01); *C22B 26/12* (2013.01); *H01M 10/0525* (2013.01); *H01M 10/54* (2013.01)

(58) Field of Classification Search
CPC ........ C01G 53/10; C01G 45/10; C01G 51/10; C22B 7/007; C22B 23/0415; C22B 26/12; H01M 10/0525; H01M 10/54
USPC ........................................................ 423/52
See application file for complete search history.

(56) References Cited

U.S. PATENT DOCUMENTS

| | | |
|---|---|---|
| 1,835,271 A | 12/1931 | Burke et al. |
| 2,669,542 A | 2/1954 | Dooley |
| 2,761,887 A | 9/1956 | Schwarzkopf et al. |
| 2,959,465 A | 11/1960 | Muro |
| 3,523,787 A | 8/1970 | Ullrich et al. |
| 3,764,655 A | 10/1973 | Ehlers et al. |
| 4,006,216 A | 2/1977 | Ettel et al. |
| 4,149,875 A | 4/1979 | Crnojevich et al. |
| 4,314,976 A | 2/1982 | Stewart et al. |
| 4,698,139 A | 10/1987 | Fugleberg et al. |
| 5,456,992 A | 10/1995 | Elliott |
| 6,009,817 A | 1/2000 | Hanulik |
| 6,447,738 B1 | 9/2002 | Rendall et al. |
| 7,247,284 B1 | 7/2007 | Seck |
| 7,454,357 B2 | 11/2008 | Buckwalter et al. |
| 7,597,873 B2 | 10/2009 | Lebl |
| 7,905,957 B2 | 3/2011 | Dwilinski et al. |
| 8,936,770 B2 | 1/2015 | Burba, III |
| 10,995,014 B1 * | 5/2021 | Fraser ............... H01M 10/0525 |
| 2013/0078520 A1 | 3/2013 | Toya et al. |

FOREIGN PATENT DOCUMENTS

| | | |
|---|---|---|
| AU | 2016101526 B4 | 2/2017 |
| CA | 2353225 C | 9/2010 |
| CA | 3043947 A1 | 12/2018 |
| CA | 3 076 688 | 4/2019 |
| CN | 100457624 C | 2/2009 |
| CN | 100515956 C | 7/2009 |
| CN | 1496592 B | 5/2010 |
| CN | 101186318 A | 10/2010 |
| CN | 101898770 B | 12/2011 |
| CN | 101871048 B | 5/2012 |
| CN | 102808082 A | 12/2012 |
| CN | 102874881 A | 1/2013 |

(Continued)

OTHER PUBLICATIONS

Nan, Junmin et al., "Recovery of metal values from a mixture of spent lithium-ion batteries and nickel-metal hydride batteries", Hydrometallurgy, Elsevier Scientific Publishing CY. Amsterdam, NL, vol. 84, No. 1-2, pp. 75-80 (2006).

(Continued)

*Primary Examiner* — Edward M Johnson
(74) *Attorney, Agent, or Firm* — Finnegan, Henderson, Farabow, Garrett & Dunner, LLP

(57) ABSTRACT

A process for generating a metal sulfate that involves crystallizing a metal sulfate from an aqueous solution to form a crystallized metal sulfate in a mother liquor with uncrystallized metal sulfate remaining in the mother liquor; separating the crystallized metal sulfate from the mother liquor; basifying a portion of the mother liquor to convert the uncrystallized metal sulfate to a basic metal salt; and using the basic metal salt upstream of crystallizing the metal sulfate. So crystallized, the generated metal sulfate may be battery-grade or electroplating-grade.

35 Claims, 8 Drawing Sheets

(56) References Cited

FOREIGN PATENT DOCUMENTS

| CN | 103682318 | A  | 3/2013  |
| CN | 102417980 | B  | 6/2013  |
| CN | 103384002 | A  | 11/2013 |
| CN | 104388677 | A  | 3/2015  |
| CN | 204497343 | U  | 7/2015  |
| CN | 104979554 | A  | 10/2015 |
| CN | 103496746 | B  | 11/2015 |
| CN | 104310496 | B  | 1/2016  |
| CN | 105870528 | A  | 8/2016  |
| CN | 104192917 | B  | 1/2017  |
| CN | 106115804 | B  | 7/2018  |
| CN | 109734107 | A  | 5/2019  |
| CN | 110527836 | A  | 12/2019 |
| EP | 2799400   | A1 | 11/2014 |
| EP | 2811040   | A1 | 12/2014 |
| EP | 2832700   | A1 | 2/2015  |
| EP | 3087208   | B1 | 10/2017 |
| JP | 2014024688 | A | 2/2014  |
| JP | 2017-149609 |  | 8/2017  |
| JP | 2019530795 | A | 10/2019 |
| KR | 101535250 | B1 | 7/2015  |
| KR | 101842823 | B1 | 3/2018  |
| WO | 1993023578 | A2 | 11/1993 |
| WO | 2006031139 | A1 | 3/2006  |
| WO | 2011143764 | A1 | 11/2011 |
| WO | 2012011205 | A1 | 1/2012  |
| WO | 2013124399 | A1 | 8/2013  |
| WO | 2015061836 | A1 | 5/2015  |
| WO | 2016054683 | A1 | 4/2016  |
| WO | 2017091562 | A1 | 6/2017  |
| WO | 2017139852 | A1 | 8/2017  |

OTHER PUBLICATIONS

Tsuen-Ni, Lung et al., "Chemical reclaiming of nickel sulfate from nickel-bearing wastes", Conservation Recycling, vol. 6, No. 1-2, pp. 55-62 (1983).

Yang, Yue et al., "Stepwise recycling of valuable metals from Ni-rich cathode material of spent lithium-ion batteries", Waste Management, Elsevier, New York, NY, vol. 102, pp. 131-138 (2019).

European Search Report for European Patent Application No. EP 21 16 7321 dated Sep. 29, 2021.

Davis, Samuel M. et al., Candidate membranes for the electrochemical salt-splitting of Sodium Sulfate, J Appl Electrochem, 2008, vol. 38, pp. 777-783.

Zouhri, Noureddine et al., Generation of sulfuric acid and sodium hydroxide from the sodium sulphate salt by electro-electrodialysis (EED), American Journal of Applied Chemistry, 2013, vol. 1, Issue 4, pp. 75-78.

* cited by examiner and battery precursor# PROCESS AND METHOD FOR PRODUCING CRYSTALLIZED METAL SULFATES This application is a continuation of U.S. application Ser. No. 17/066,769, filed Oct. 9, 2020, which claims the benefit of U.S. Provisional Application No. 63/050,191, filed Jul. 10, 2020; the contents of each application is incorporated herein by reference in its entirety.

FIELD

The present disclosure relates generally to producing metal sulfates. More particularly, the present disclosure relates to generating crystallized metal sulfates, such as battery-grade metal-sulfates.

BACKGROUND

Climate change is driving electrification of transportation, and as a result, the need for batteries, such as lithium ion batteries (LIBs). Although LIBs are already ubiquitous in society, the total annual consumption is small compared to that which would be required for mass-market electric vehicle adoption. With a growing demand for LIBs, there is a growing demand for the chemicals from which they are produced, particularly battery-grade metal sulfates.

Nickel and cobalt sulfate battery chemicals are commonly produced by separately dissolving nickel metal and cobalt metal with sulfuric acid and conducting purification prior to crystallizing them as battery grade sulfates. This metal dissolution process is performed both by cathode manufacturers and by mining companies that have built sulfate production circuits at their refineries. The metal dissolving pathway from ore to battery requires the expensive steps of either electrowinning or hydrogen reduction to produce London Metal Exchange (LME) grade metal prior to dissolution. This pathway is a major contributor to the premium demanded for battery grade sulfates, mainly nickel sulfate, over metals prices. The industry is moving towards more direct production pathways from concentrate or intermediates to battery chemicals. For example, more direct pathways have already been developed for cobalt chemicals thanks to the maturity of the lithium-cobalt-oxide battery chemistry used in cell phones and electronics.

Further, current battery chemical production processes often include separation of cobalt and nickel via solvent extraction (SX), which enables production of individual battery grade sulfates that meet purity requirements. SX can be very effective in separating metals, but is a relatively complex unit operation, requiring multiple stages of extraction, scrubbing and stripping, and systems for organic treatment of aqueous discharge streams, crud removal, organic vapour recovery, and fire protection. These requirements result in substantial capital costs associated with a commercial scale SX operation. Depending on the number of SX circuits required, the direct costs associated with SX can be more than 30% of the refinery cost.

Further, producing battery-grade metal sulfates results in by-product salts for which disposal may be difficult. Often in current battery chemical production processes, SX and other impurity removal steps must be operated at a specific pH level to perform effectively. One of the bases generally used is sodium hydroxide because it is water soluble and available at high purities, allowing for effective pH control while minimizing scaling issues and minimizing the introduction of further impurities to the process. High consumption of sodium hydroxide, however, leads to the production of large quantities of sodium sulfate, which presents a serious impending environmental challenge. Sodium sulfate is a bulk commodity chemical product, but because of its low value (e.g., at 90-150 USD per tonne), transport costs frequently negate the benefit of its sale when no local demand exists. Further, the market for sodium sulfate is limited, and may be exceeded by the forecasted production resulting from new battery chemicals and battery precursor plants.

An improved process and method for producing crystallized metal sulfates is desired.

BRIEF DESCRIPTION OF THE FIGURES

Embodiments of the present disclosure will now be described, by way of example only, with reference to the attached Figures.

DETAILED DESCRIPTION

Figure 1:
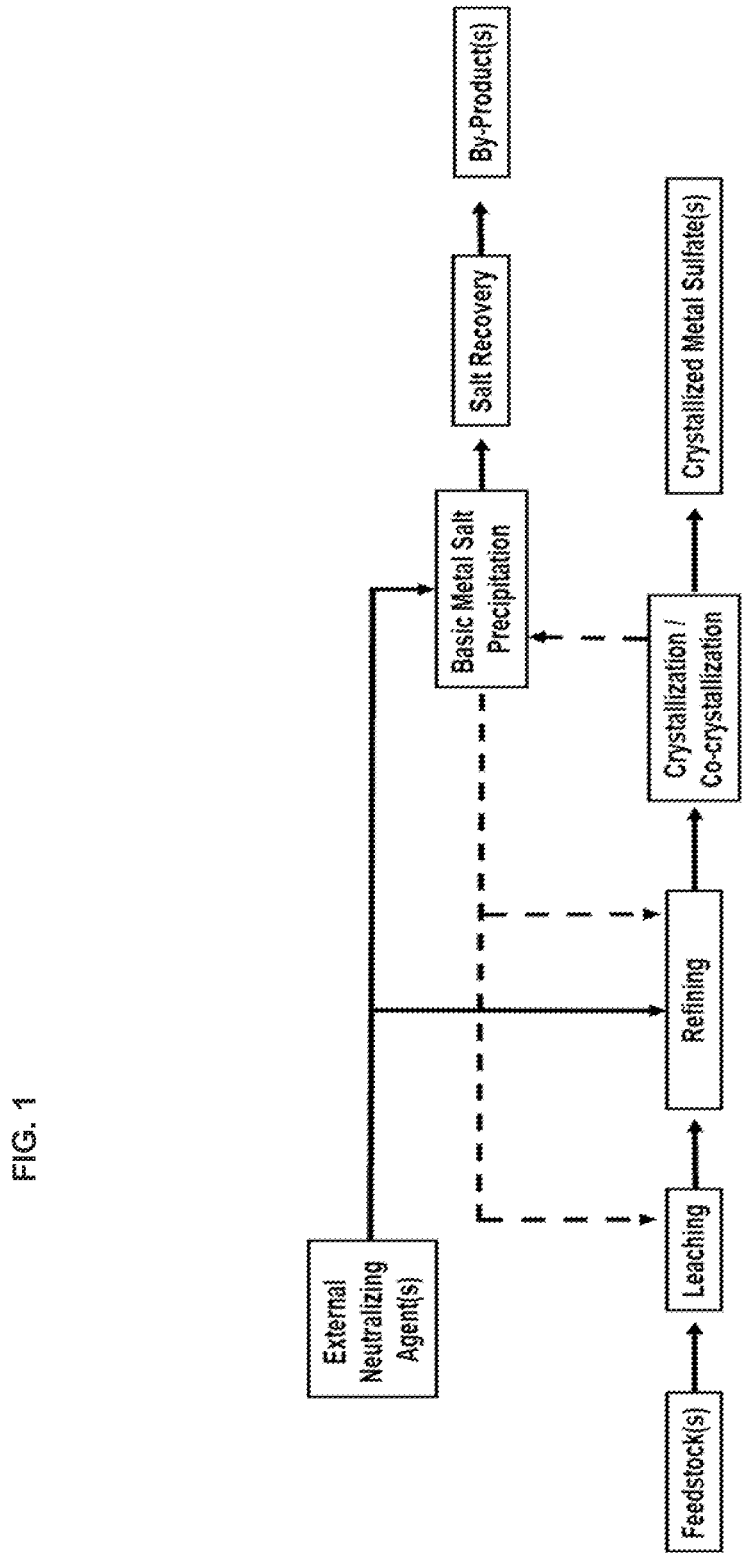
FIG. 1 depicts a flow diagram of a process for isolating crystallized metal sulfates from a feedstock, including the steps of feedstock leaching, refining, crystallization/co-crystallization, basic metal salt precipitation, and metal sulfate isolation.

The present disclosure describes a process for generating a metal sulfate, the process comprising: crystallizing a metal sulfate from an aqueous solution to form a crystallized metal sulfate in a mother liquor, the mother liquor comprising an uncrystallized metal sulfate; separating the crystallized metal sulfate from the mother liquor; basifying a portion of the mother liquor to convert the uncrystallized metal sulfate to a basic metal salt; and using the basic metal salt upstream of crystallizing the metal sulfate.

In one or more embodiments of the process described herein, using the basic metal salt upstream comprises converting the basic metal salt back to the uncrystallized metal sulfate. In one or more embodiments, converting the basic metal salt back to the uncrystallized metal sulfate comprises using the basic metal salt as a first neutralizing agent to neutralize acid upstream of crystallizing the metal sulfate. In one or more embodiments of the process described herein, basifying the portion of the mother liquor to convert the uncrystallized metal sulfate to the basic metal salt further comprises: bleeding the mother liquor and controlling the bleed rate to produce an amount of the basic metal salt that is at least approximately equivalent to an amount of the acid to be neutralized upstream of crystallizing the metal sulfate. In one or more embodiments of the process described herein, using the basic metal salt as the first neutralizing agent comprises using the basic metal salt as the first neutralizing agent in a leaching stage; or comprises using the basic metal salt as the first neutralizing agent in a refining stage.

In one or more embodiments of the process described herein, basifying the portion of the mother liquor comprises using a second neutralizing agent to convert the uncrystallized metal sulfate to the basic metal salt. In one or more embodiments of the process described herein, the second neutralizing agent is sodium hydroxide, and the sodium hydroxide is converted to sodium sulfate when converting the uncrystallized metal sulfate to the basic metal salt. In one or more embodiments, the process further comprises converting the sodium sulfate back to the sodium hydroxide by electrolysis. In one or more embodiments of the process described herein, the second neutralizing agent is any one or combination of potassium hydroxide, calcium hydroxide, lithium hydroxide, or magnesium oxide. In one or more embodiments, using any one or combination of potassium hydroxide, calcium hydroxide, lithium hydroxide, or magnesium oxide forms any one or combination of potassium sulfate, calcium sulfate, lithium sulfate, or magnesium sulfate as a by-product.

In one or more embodiments of the process described herein, the process further comprises crystallizing the uncrystallized metal sulfate. In one or more embodiments, crystallizing the metal sulfate further comprises bleeding the mother liquor and controlling the bleed rate to selectively inhibit crystallizing an impurity when crystallizing the metal sulfate. In one or more embodiments, crystallizing the metal sulfate further comprises controlling an amount of free water in the crystallizer to selectively inhibit crystallizing an impurity when crystallizing the metal sulfate. In one or more embodiments, controlling the amount of free water comprises controlling rate of water evaporation from the crystallizer, or controlling addition of water to the crystallizer. In one or more embodiments, the impurity comprises lithium, sodium, potassium, or magnesium.

In one or more embodiments of the process described herein, the process further comprises leaching a feedstock and forming the aqueous solution comprising the metal sulfate. In one or more embodiments, the feedstock comprises any one or combination of mixed hydroxide precipitates, mixed sulfide precipitates, nickel sulfide concentrate, cobalt sulfide concentrate, nickel laterite, nickel matte, ferronickel, material derived from recycled lithium ion batteries or lithium ion battery manufacturing scrap, or spent cathode material. In one or more embodiments of the process described herein, the process further comprises isolating the basic metal salt from the mother liquor. In one or more embodiments, isolating the basic metal salt comprises using a one-stage or two-stage precipitation circuit and selectively precipitating the basic metal salt. In one or more embodiments of the process described herein, the metal sulfate is any one or combination of nickel sulfate, cobalt sulfate, or manganese sulfate. In one or more embodiments of the process described herein, the basic metal salt comprises a metal hydroxide. In one or more embodiments, the metal hydroxide comprises any one or a combination of nickel hydroxide, cobalt hydroxide, or manganese hydroxide.

In one or more embodiments of the process described herein, crystallizing the metal sulfate comprises selectively crystallizing any one or two of the nickel sulfate, manganese sulfate, and cobalt sulfate from the aqueous solution. In one or more embodiments of the process described herein, crystallizing the metal sulfate comprises selectively crystallizing any combination of the nickel sulfate, manganese sulfate, and cobalt sulfate from the aqueous solution. In one or more embodiments of the process described herein, the crystallized metal sulfate is a battery-grade crystallized metal sulfate, or an electroplating-grade crystallized metal sulfate.

In one or more embodiments, the process as described herein further comprises refining the aqueous solution comprising the metal sulfate (e.g., a sulfate-matrix, pregnant leach solution (PLS), where the PLS is subjected to any one or combination of refining stages (also referred to herein as impurity or component removal stages) to remove specific impurities or components such as: Cu (e.g., via sulfiding, solvent extraction, cementation, ion exchange, etc.), Fe and Al (e.g., via precipitation, ion exchange, etc.), Zn (e.g., via sulfiding, solvent extraction, ion exchange, etc.), Co (e.g. via solvent extraction, ion exchange, precipitation etc.), Ca (e.g. via solvent extraction, ion exchange, etc.), Mg (e.g. via solvent extraction, ion exchange etc.), F (e.g. via calcium/lime addition), or graphite (e.g. via filtration).

The refined PLS is introduced into a crystallizer under conditions sufficient to selectively crystalize any one or combination of nickel sulfate ($NiSO_4$), cobalt sulfate ($CoSO_4$), manganese sulfate ($MnSO_4$), and lithium sulfate ($Li_2SO_4$) from the refined PLS to produce crystallized metal sulfates in a mother liquor (e.g., via a forced circulation crystallizer under vacuum, etc., against lithium, magnesium, sodium, or potassium depending on the feedstock). These crystallized metal sulfates are then isolated from the mother liquor (e.g., discharged from the crystallizer). If one crystallization cycle (e.g., using one crystallizer) is insufficient to produce crystallized metal sulfates (which may occur, e.g., with feedstocks containing higher concentrations of impurities), the crystals discharged from the crystallizer may be dissolved in pure water to form aqueous sulfate solutions before being introduced into a second crystallization cycle (e.g., using a second crystallizer) to be recrystallized.

After crystallization, the mother liquor contains undesired salts/metals (e.g., $Li_2SO_4$, $MgSO_4$, $Na_2SO_4$ etc.), as well as metal sulfates that did not crystallize out of solution (also referred to herein as the uncrystallized metal sulfate). To selectively recover these uncrystallised metal sulfates from the remaining undesired materials in solution, the mother liquor is bled from the crystallizer(s), and basified to convert the uncrystallised metal sulfates into basic metal salts, such as metal hydroxides (e.g., $Ni(OH)_2$, $Co(OH)_2$, $Mn(OH)_2$, etc.). These metal hydroxides are used up-stream to neutralize acids introduced during the leaching that formed the PLS and/or the refining stages of the process, thus converting the metal hydroxides back to metal sulfates that can then be isolated via crystallization. Prior to use upstream, the metal hydroxides may be isolated from the mother liquor and washed, and may be reslurried with water for transfer, which can limit exposure to air and thus limit oxidation of the hydroxides.

In addition to using the metal hydroxides as neutralizing agents, the process may also use external sources of neutralizing agents (e.g., added oxides, hydroxides) to basify the mother liquor coming out of the crystallizer, and optionally to neutralize acids introduced during leaching and/or the refining stages. These external neutralizing agents are selected either for their capacity to be regenerated from their waste product (e.g., via electrolysis, etc.), to minimize or avoid forming waste streams (e.g., CaO/CaCO$_3$ as agents, CaSO$_4$.2H$_2$O as waste product; NaOH as agent, Na$_2$SO$_4$ as waste product); or for their capacity to generate higher valued by-products (e.g., KOH as agent, K$_2$SO$_4$ as by-product).

Generally, the process is largely feedstock-agnostic, and can tolerate raw feedstocks (e.g., concentrates, mixed hydroxide/sulfide precipitates, other Ni-based feedstocks) and recycled feedstocks (e.g., spent battery materials). The process may also include leaching feedstocks under conditions (e.g. pressure leaching, pressure oxidation) to form the aqueous solution comprising the metal sulfate (e.g., the sulfate-matrix, pregnant leach solution (PLS).

The process may produce any one or combination of crystalized nickel sulfate (NiSO$_4$), cobalt sulfate (CoSO$_4$), manganese sulfate (MnSO$_4$), and lithium sulfate (Li$_2$SO$_4$). The process may produce any one or two of crystalized nickel sulfate (NiSO$_4$), cobalt sulfate (CoSO$_4$), and manganese sulfate (MnSO$_4$). The process may produce all three of crystalized nickel sulfate (NiSO$_4$), cobalt sulfate (CoSO$_4$), and manganese sulfate (MnSO$_4$). Of the crystallized metal sulfates isolated from the process, some may be battery-grade. Of the crystallized metal sulfates isolated from the process, some may be suitable for use in electroplating. Of the crystallized metal sulfates isolated from the process, some may be metal sulfate hydrates (e.g., crystallized metal sulfates and water molecules combined in a variety of ratios as an integral part of the crystal; for example, a ratio of one water molecule per metal sulfate, or six water molecules per metal sulfate, or seven water molecules per metal sulfate).

Figure 2:
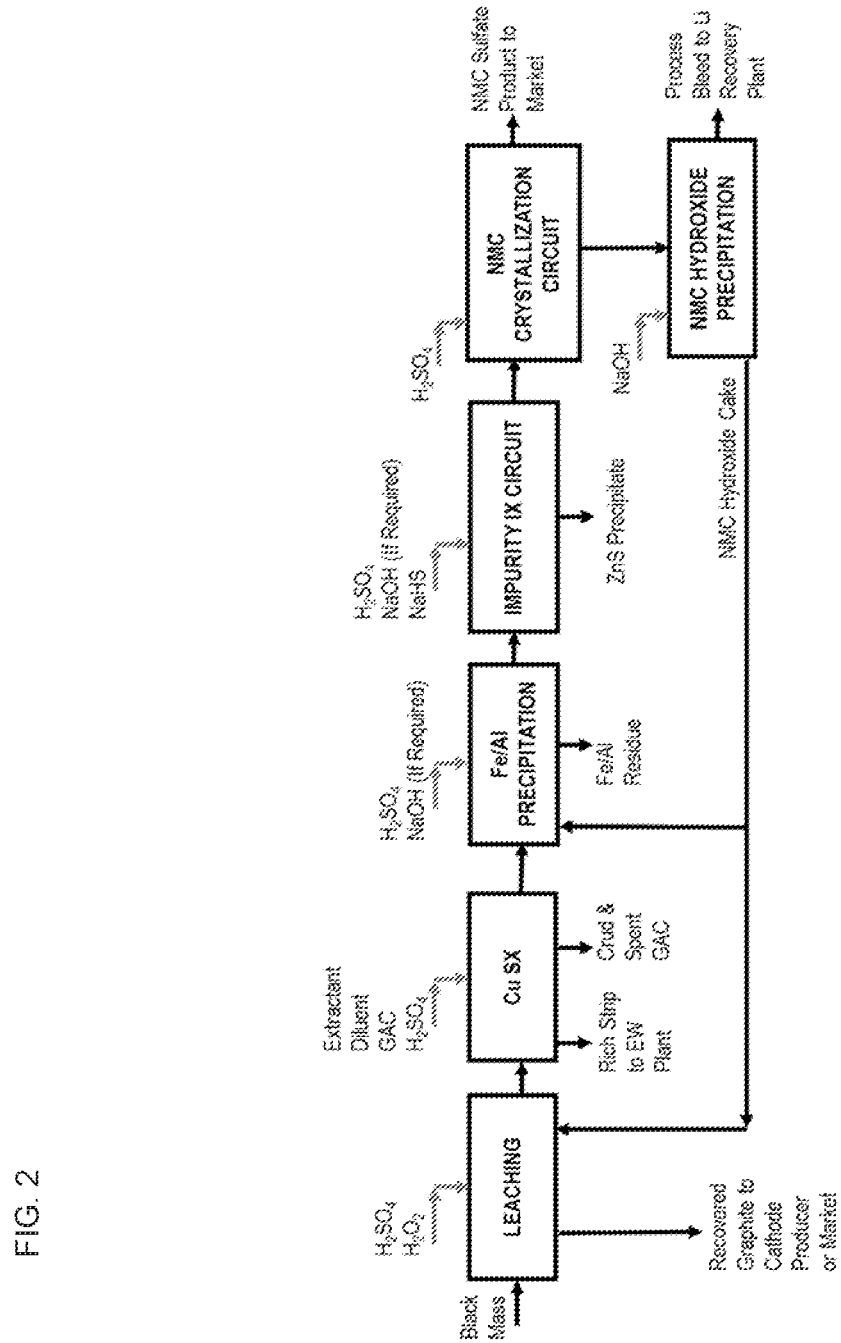
FIG. 2 depicts a flow diagram of a process for isolating battery grade metal sulfates having a low concentration of lithium impurities.
Figure 2A:
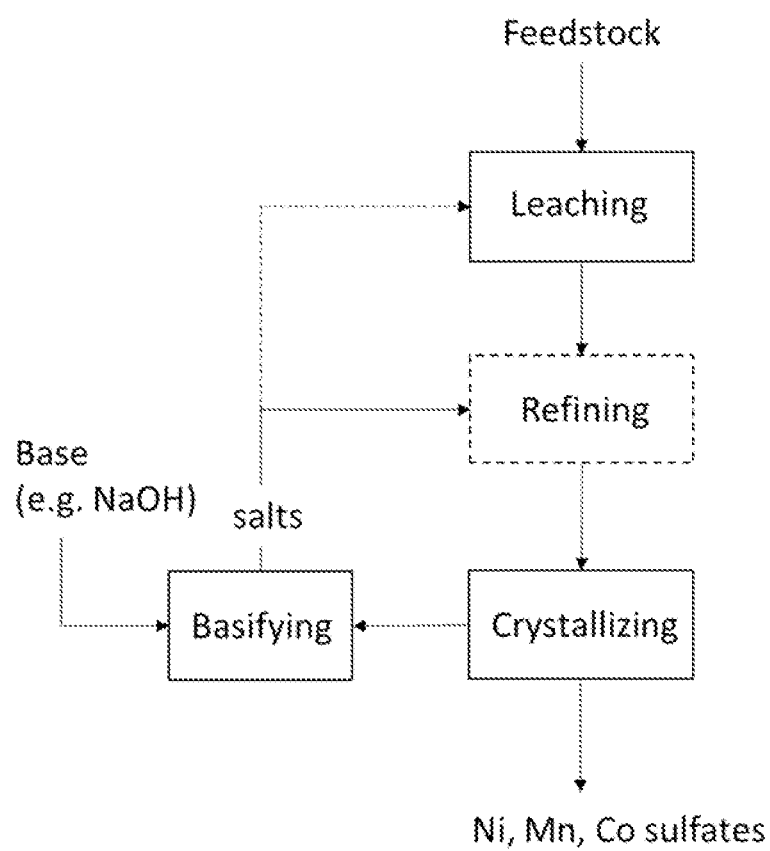
FIG. 2a depicts a flow diagram of a general process for generating metal sulfates.

In one or more embodiments of the present disclosure, there is provided a process as depicted in FIG. 1 or FIG. 2a.

Leaching

In one or more embodiments of the process described herein, the process comprises leaching a feedstock and forming the aqueous solution comprising the metal sulfate. In one or more embodiments, the leaching is depicted in FIG. 1 or FIG. 2a (see 'Feedstock' and 'Leaching').

The process begins with an input of one or more feedstocks. Suitable feedstocks include any feedstock that comprises any one or a combination of nickel (Ni), cobalt (Co), manganese (Mn), or lithium (Li). In some embodiments, the feedstock may comprise any one or combination of a raw feedstock, and a recycled materials feedstock. Examples of raw feedstocks include, but are not limited to, mixed hydroxide precipitates (MHP), mixed sulfide precipitates (MSP), nickel sulfide concentrate, cobalt sulphide concentrate, nickel laterite, nickel matte, or ferronickel. Examples of recycled materials feedstocks include, but are not limited to, spent cathode material, and material derived from recycled lithium ion batteries or lithium ion battery manufacturing scrap (collectively, referred to herein as black mass).

The feedstock is leached under conditions to form an aqueous solution comprising a metal sulfate (PLS); for example, a sulfate-matrix, pregnant leach solution. Generally, leaching conditions comprise reacting the feedstock with an acidic leachate stream that may comprise: an acid stream; an acid stream and hydrogen peroxide; an acid stream and sulphur dioxide; or an acid stream and another reductant, such as sucrose. The leaching conditions may also comprise solubilizing the feedstock by oxidizing it in a pressure vessel using oxygen or air. In forming the sulfate-matrix PLS, the acid stream may act as a sulfate source, and comprise, e.g., sulfuric acid; or the acid stream and/or the feedstock may act as a sulfate source.

There are a number of leaching conditions that may be suitable for forming the PLS. Based on the type or source of feedstock to be processed, a skilled person would recognize which leaching conditions to select and test, in order to confirm the selection and to define the specific conditions. For example, leaching may occur at ambient, or above ambient temperatures and/or pressures. For feedstocks comprising MHP or black mass, leaching may occur at temperatures of about 65° C. and at atmospheric pressures, e.g., with the addition of acid and reducing agents. For feedstocks comprising MSP or nickel matte, leaching may occur via pressure leaching and/or pressure oxidation at temperatures between 150 and 220° C.

The leaching conditions may be selected to minimize use of acid or base reagents. For example, the leaching conditions may comprise countercurrent leaching, which involves contacting and flowing the feedstock and acidic leachate stream in opposing directions. Using such a countercurrent flow can increase leaching efficiencies and decrease acid reagent use at the leaching stage. By reducing acid reagent use, countercurrent leaching can also reduce base reagent use, as there would be less acid passing downstream in the process that would need to be later neutralized by a base. In some embodiments, the leaching conditions may comprise pressure leaching, which by oxidation of sulfides in the feedstock, may generate sulfates and thus not require additional acid reagent to be used to solubilize metals in the feedstock.

Figure 3:
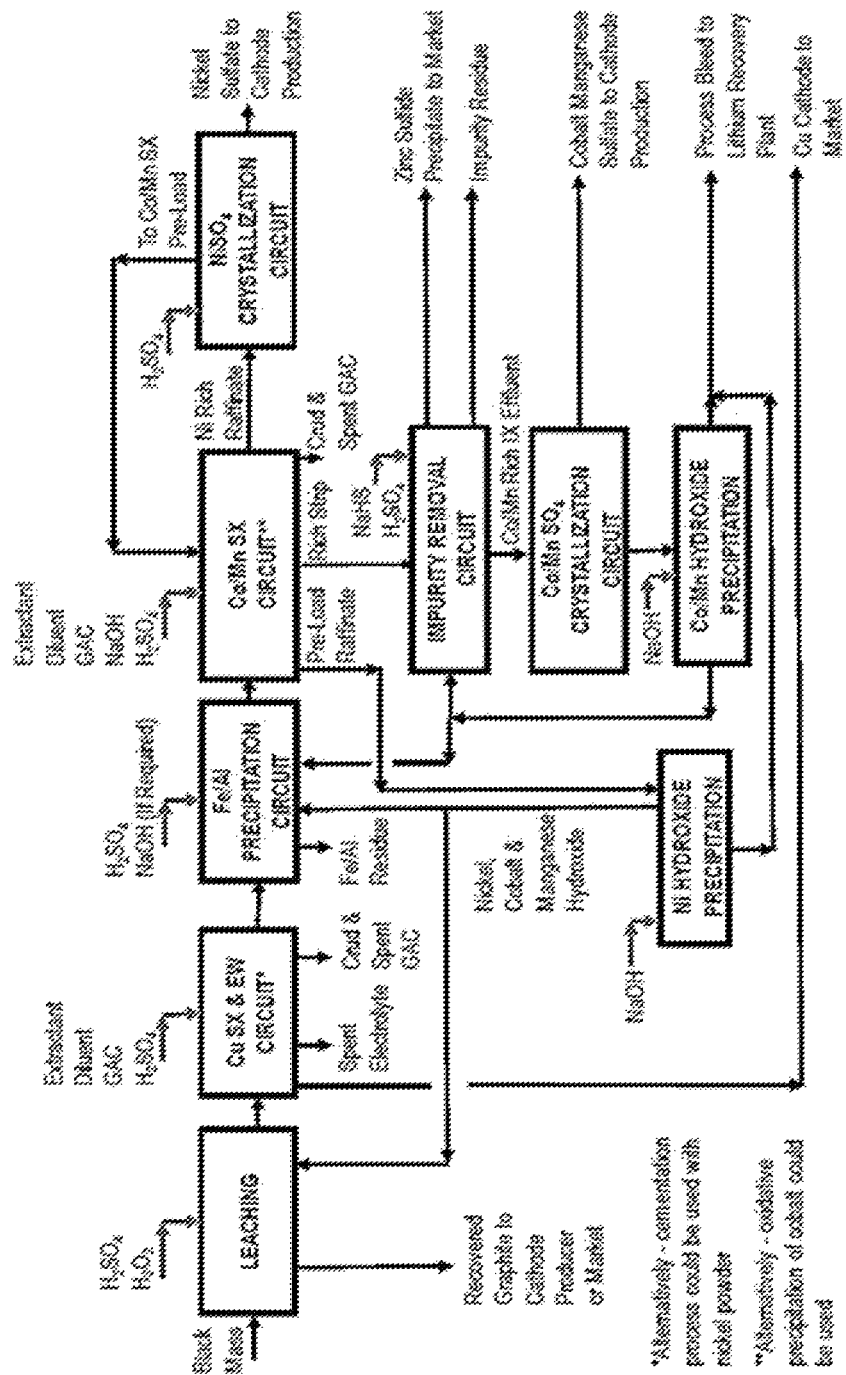
FIG. 3 depicts a flow diagram of a hydrometallurgical process for recovery of cobalt and manganese sulfates and nickel sulfate produced from a nickel, manganese, cobalt and lithium-containing feedstock using Co/Mn solvent extraction, Co/Mn crystallization, and Ni crystallization.
Figure 4:
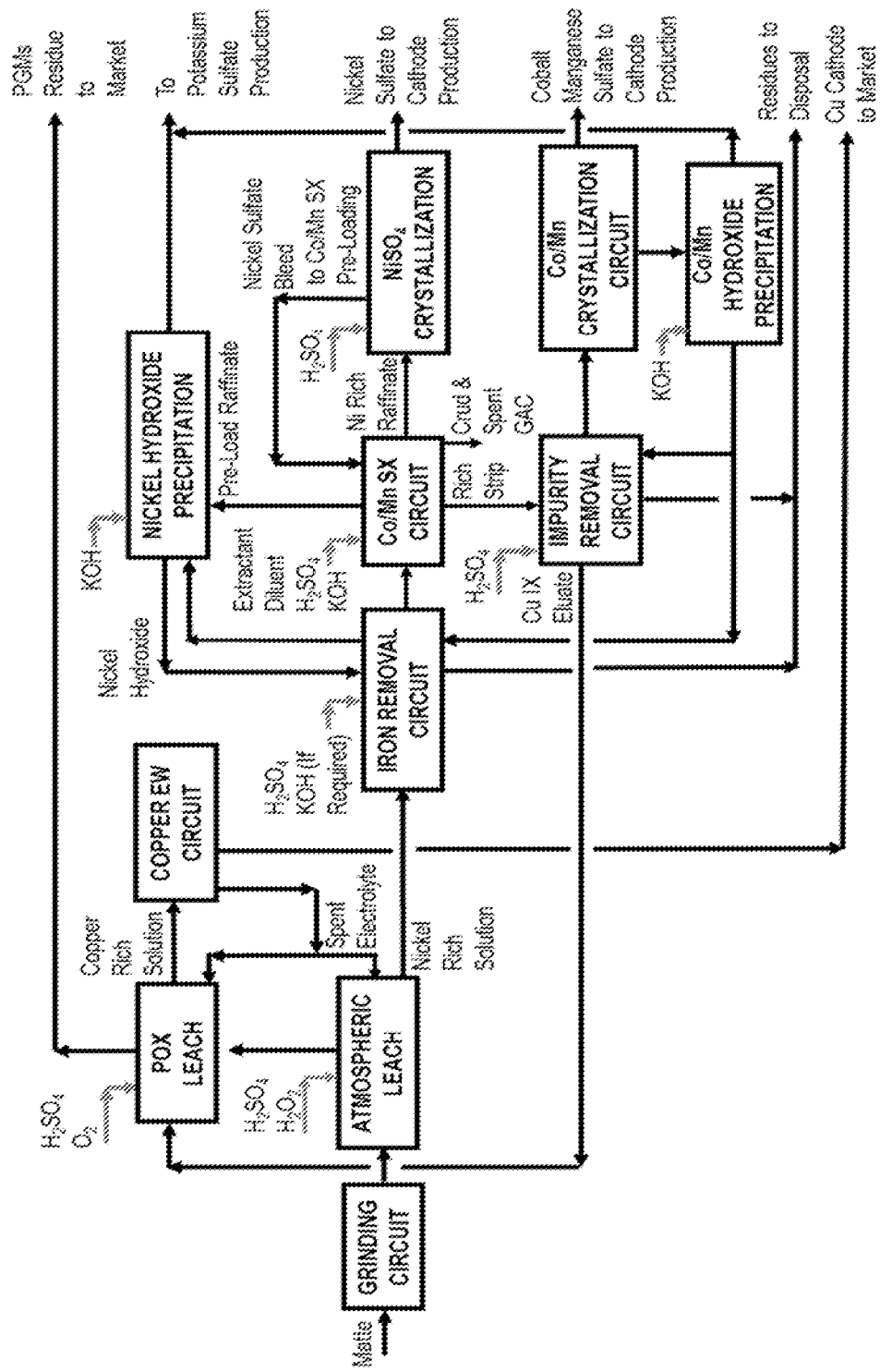
FIG. 4 depicts a flow diagram of a hydrometallurgical process involving a matte leaching stage, with Co/Mn removal stage, Co/Mn crystallization, and Ni crystallization selective (or not) over potassium.
Figure 5:
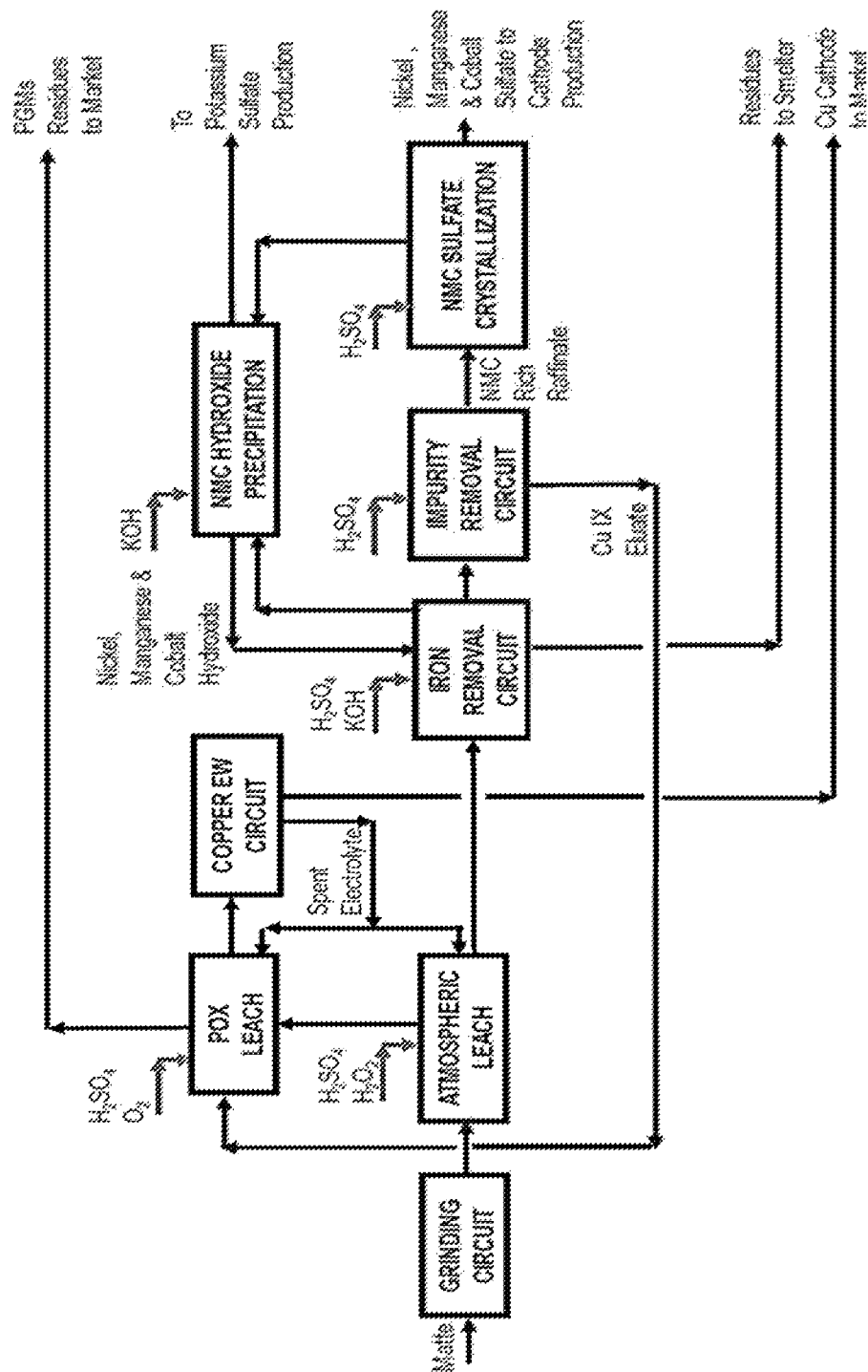
FIG. 5 depicts a flow diagram of a hydrometallurgical process involving a matte leaching stage, with NMC crystallization selective (or not) over potassium.
Figure 6:
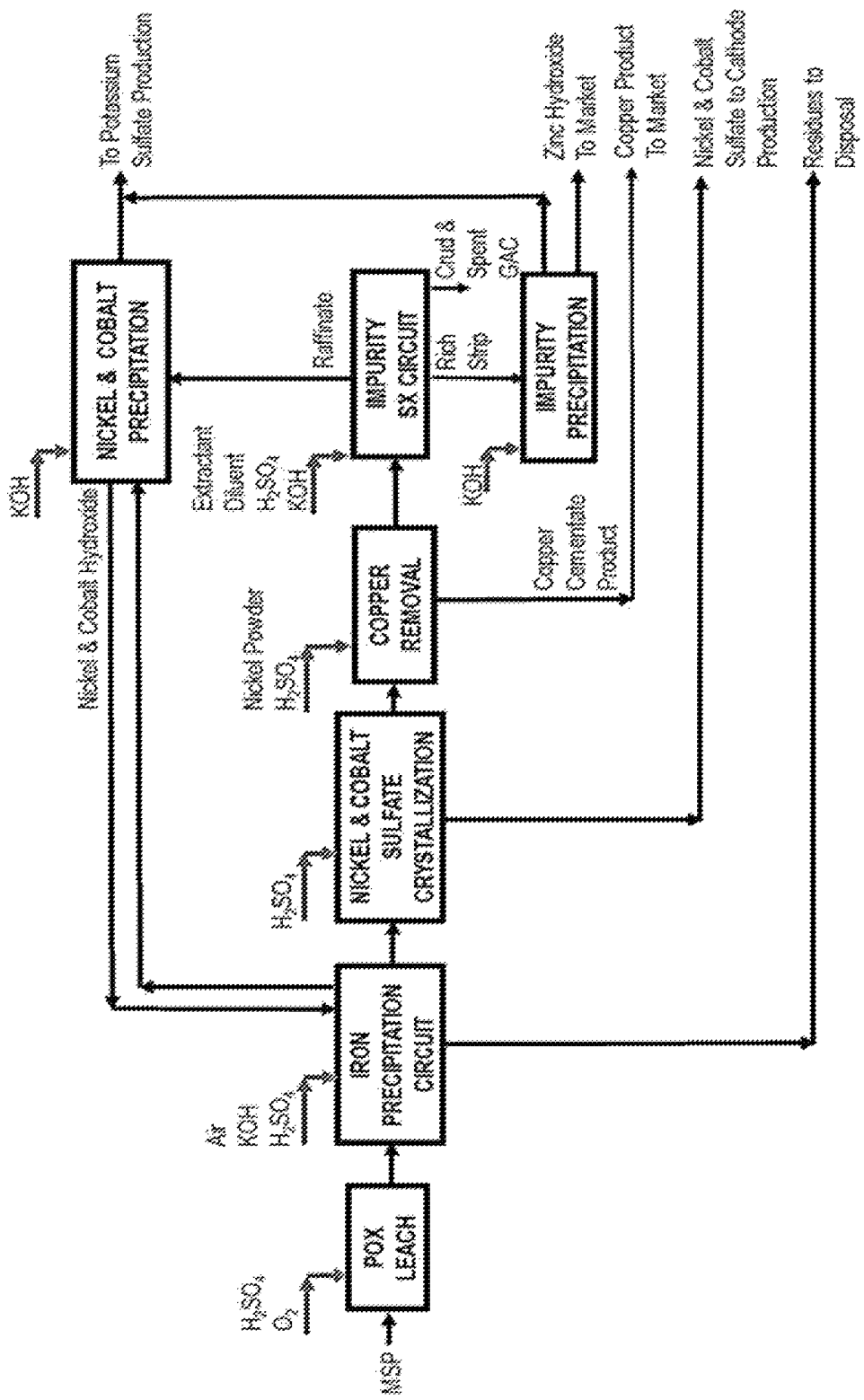
FIG. 6 depicts a flow diagram of a hydrometallurgical process involving a mixed sulfide precipitation leaching stage with Ni/Co crystallization.
Figure 7:
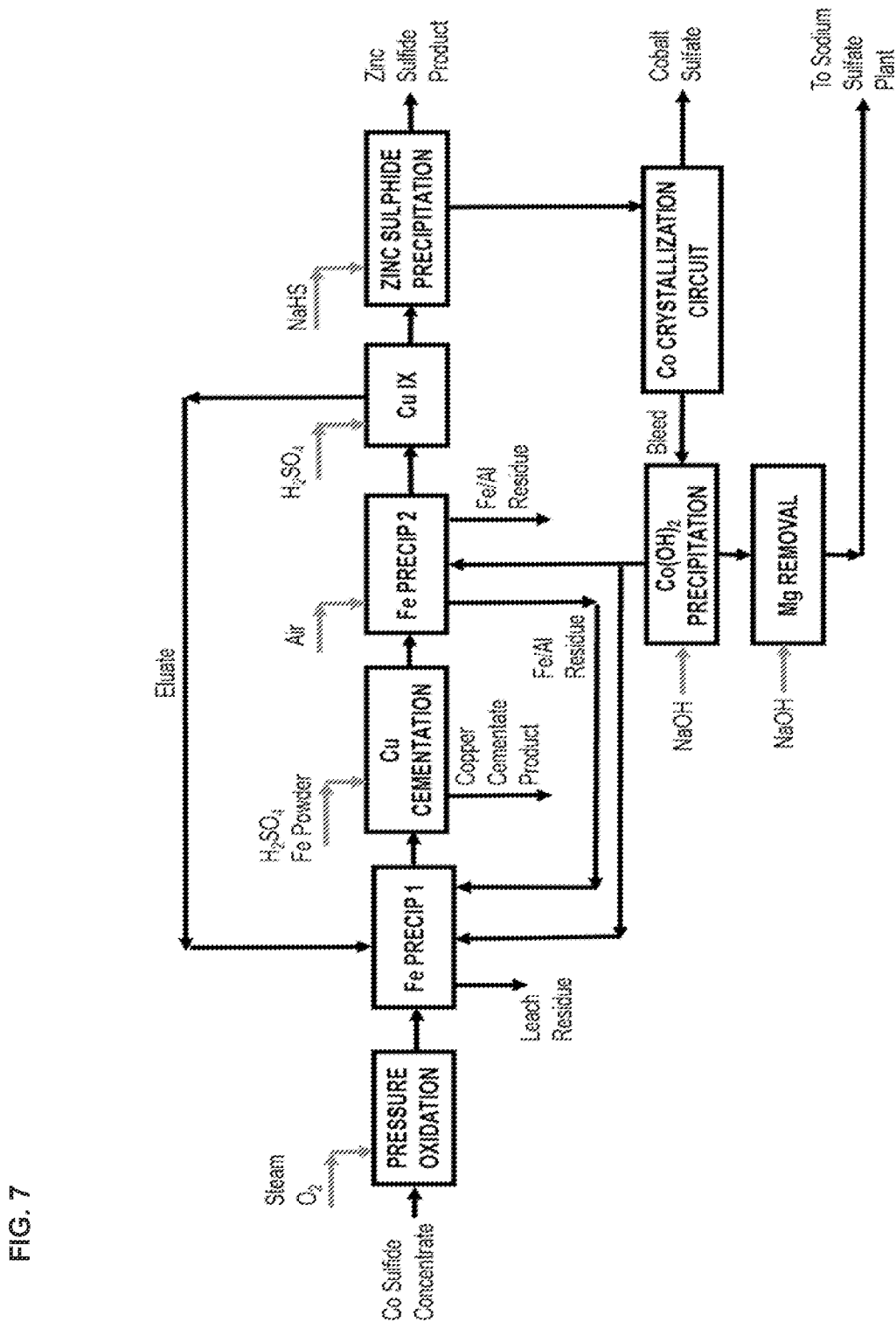
FIG. 7 depicts a flow diagram of a process for cobalt concentrate leaching followed by $CoSO_4$ crystallization to make battery-grade $CoSO_4$.

In one or more embodiments of the process described herein, the process comprises leaching a feedstock and forming the aqueous solution comprising the metal sulfate as described and depicted in: Example 1 and FIG. 2/FIG. 2a (e.g., see Black Mass Leaching and NMC Leach); Example 2 and FIG. 3 (e.g., see Black Mass Leaching and NMC Leach); Example 3 and FIG. 4 (e.g., see Atmospheric and Pressure Oxidative Leach); Example 4 and FIG. 5 (e.g., see Atmospheric and Pressure Oxidative Leach); Example 5 and FIG. 7 (e.g., see Pressure Oxidative Leaching); and Example 7 and FIG. 6 (e.g., see Pressure Oxidative Leaching).

Refining

In one or more embodiments, the process as described herein comprises refining the aqueous solution comprising the metal sulfate (e.g., a sulfate-matrix, pregnant leach solution (PLS), where the PLS is subjected to any one or combination of refining stages (also referred to herein as impurity or component removal stages) to remove specific impurities or components. In one or more embodiments, the refining is depicted in FIG. 1 or FIG. 2a (see 'Refining').

Following leaching, the PLS undergoes one or more refining stages to refine the PLS by removing one or more impurities or components. The type and amount of impurities or components to be removed is dependent, at least in part, on the type of feedstock from which the PLS is formed, as well as the specifications for the final product generated by the process (e.g., purity, grade, when only one or two of nickel sulfate (NiSO$_4$), cobalt sulfate (CoSO$_4$), and manganese sulfate (MnSO$_4$) are required, etc.). Examples of impurities or components to be removed include, but are not limited to, sodium (Na), aluminum (Al), iron (Fe), copper (Cu), zinc (Zn), lithium (Li), cobalt (Co), and manganese (Mn). Components that may need to be removed may include any one or two of nickel, cobalt, and manganese, such that only one or two of crystallized nickel sulfate (NiSO$_4$), cobalt sulfate (CoSO$_4$), and manganese sulfate (MnSO$_4$) are isolated from the crystallizer; e.g., for use as a final product, such as battery-grade metal sulfate(s). Otherwise, all three of nickel sulfate ($NiSO_4$), cobalt sulfate ($CoSO_4$), and manganese sulfate ($MnSO_4$) are isolated from the crystallizer. When battery-grade metal sulfates are required, there are specific product specifications (e.g., limits) for such impurities that are tolerated for, e.g., battery-grade nickel sulfate; and any such impurities that are present in a process' feedstock, water, or reagents in an amount that exceeds said product specification would need to have their concentration reduced.

There are many suitable methods for removing impurities or components from the PLS. Such methods include, but are not limited to precipitation, atmospheric or pressure leaching, sulfidation, solvent extraction, ion exchange, and cementation. Selecting the appropriate method (and operational conditions thereof) depends, at least in part, on the type and amount of impurities or components to be removed, as well as the specifications for the final product generated by the process. For example, copper may be removed via precipitation, solvent extraction, sulfidation, cementation, or ion exchange, etc.; iron and aluminum may be removed via precipitation, or ion exchange, etc.; zinc may be removed via sulfidation, solvent extraction, or ion exchange, etc.; and cobalt may be removed via solvent extraction, ion exchange, or oxidative precipitation etc. The conditions and operational parameters for each method are generally known and can be selected depending on the type and amount of impurity or component to be removed.

For example, cementation is a process involving a redox reaction between a first metal ion and a first solid metal, whereby the first metal ion is reduced to a second solid metal by the first, and the first solid metal is in turn oxidized to a second metal ion. Cementation may be selected for removing, e.g., copper because it can add value metals to the process (for example, by adding Ni if nickel powder is used as the first solid metal) without the use of other reagents; and/or because it can allow removal of impurities (for example, by reduction) without having to add acid or base reagents to the process.

The refining stages for removing impurities or components from the PLS may be selected to minimize use of acid or base reagents. For example, Cu can be removed via cementation with nickel powder, which requires little acid and no base, and generates no acid; in contrast, removal of Cu by solvent extraction (SX) requires one mole of sulphuric acid per mole of Cu removed, and all of said added acid needs to be neutralized by a base downstream. Other impurities such as Fe and Al can be removed via precipitation by raising the pH (e.g., to about 5.5), which requires added base but no added acid; base which can be introduced as an external neutralizing agent, or as a basic metal salt generated downstream in the process. In contrast, removal of Fe and Al by ion exchange (IX) requires added base to load the Fe and Al onto the exchange column, and it also requires added acid to strip the Fe and Al off the exchange column, and additional reagents or process steps to convert those impurities to a disposable form.

In one or more embodiments of the process described herein, the process comprises refining the aqueous solution comprising the metal sulfate (PLS), where the PLS is subjected to any one or combination of refining stages as described and depicted in: Example 1 and FIG. 2/FIG. 2a (e.g., see Copper SX, Impurity Removal, Impurities Ion Exchange); Example 2 and FIG. 3 (e.g., see Copper SX, Impurity Removal, Co/Mn Solvent Extraction); Example 3 and FIG. 4 (e.g., see Copper Removal, Iron Removal, Impurity Removal Circuit, Cobalt/Manganese Solvent Extraction); Example 4 and FIG. 5 (e.g., see Copper Removal Circuit, Iron Removal, Cobalt/Manganese Solvent Extraction); Example 5 and FIG. 7 (e.g., see Iron Precipitation 1 and 2, Copper Cementation, Copper Ion Exchange); and Example 7 and FIG. 6 (e.g., see Iron Removal).

Crystallization/Co-Crystallization

The process described herein comprises crystallizing a metal sulfate from an aqueous solution to form a crystallized metal sulfate. In one or more embodiments, the crystallizing is depicted in FIG. 1 or FIG. 2a (see 'Crystallization/Co-Crystallization' or 'Crystallizing').

The refined PLS is introduced into a crystallizer under conditions sufficient to selectively crystalize or co-crystallize any one or combination of nickel sulfate, cobalt sulfate, manganese sulfate, and/or lithium sulfate from solution. Such selective crystallization occurs against components such as lithium, sodium, potassium, magnesium, that remain in the refined PLS (depending on the feedstock) to provide one or more crystallized metal sulfates (e.g., NMC sulfates and/or lithium sulfates) in a mother liquor.

Different types of crystallizers may be suitable for affecting the selective crystallization or co-crystallization of NMC sulfates and/or lithium sulfates. Such crystallizers include, but are not limited to, evaporative crystallizers, forced circulation (FC) crystallizers, indirect force circulation (IFC) crystallizers, and draft tube baffle (DTB) crystallizers. The conditions and operational parameters for such crystallizers can be selected depending on the type and purity of metal sulfate to be crystallized, and/or the type and concentration of impurities in the PLS. For example, if an IFC or DTB crystallizer is used, coarser crystals may be formed when crystallizing NMC sulfates; this can inhibit the entrainment of impurities during said crystallization, such as lithium, sodium magnesium, and/or potassium. If a forced circulation crystallizer is used, it may be operated under vacuum in order to flash cool the PLS to ambient temperatures (e.g., about 25° C.), which in turn can facilitate water evaporation and NMC sulfate and/or lithium sulfate crystallization. In such cases, the amount of free water being evaporated may be less than the amount necessary to reach a saturation point of certain impurities, such as lithium or sodium. When a crystallizer is used to selectively crystallize nickel sulfate, cobalt sulfate, and manganese sulfate together against impurities such as lithium and sodium, the crystallizer may be operated at a pH level between 1-5, or between 1.5-2.5. In some embodiments, a pH level less than 0, less than 1.5, or between 0.5-1.5 is effective.

Further, the conditions and operational parameters of the crystallizer may be selected to selectively crystallize one metal sulfate, or combination of metal sulfates, over other sulfates and components (e.g., impurities) in solution. For example, when the concentration of one or two metal sulfates are at a very low concentration in the PLS, and a third metal sulfate is at a much higher concentration, careful selection of the crystallizer bleed rate (e.g., a sufficiently high bleed rate) can allow for selective crystallization of the third metal sulfate over the one or two metal sulfates.

The conditions and operational parameters for the crystallizer may also be selected to manage the purity of the crystallized metal sulfates. Bleeding the mother liquor from the crystallizer during crystallization, and the rates at which the bleeding occurs, can impact the purity of the crystallized metal sulfates; for example, by selectively inhibiting crystallization of impurities. As used herein, selecting a bleed rate to selectively inhibit crystallization of a specific impurity means to set a crystallizer bleed rate, within a range of possible bleed rates that inhibits the crystallization of the specific impurity more so than it would inhibit crystallization of a different impurity. The bleed rate may be selected such that it maximizes inhibiting crystallization of the specific impurity. The impurities may be lithium, sodium, potassium, magnesium, etc. Using a higher bleed rate of the mother liquor helps to maintain lower concentrations of impurities and other components in the mother liquor that could impact the purity of the crystallized metal sulfates. For example, having a crystallizer bleed rate that is greater then 40% of the crystallizer feed rate (i.e., rate at which the refined PLS is introduced into the crystallizer) can result in crystallized metal sulfates that are substantially free of Li (e.g., <2% Li, or <1% Li, or <0.5% Li, or <0.1% Li) because of selective inhibition of Li crystallization. In one example, if the refined PLS is of lower purity, for instance due to a 30% increase in a primary feedstock impurity, this results in a lower NMC Crystallization single pass yield on the order of 5 to 10% and a higher overall mother liquor bleed.

Further, impurity solubility can be temperature dependent; therefore, selecting the crystallizer temperatures as well as the crystallizer bleed rates can be effective in managing the purity of the metal sulfate(s) being crystallized. For example, lithium sulfate solubility decreases with increasing temperature, so if the crystallizer is operated at higher temperatures, any lithium sulfate remaining in the PLS may precipitate out and impact the purity of the crystallized metal sulfates. However, if the crystallizer is operated at lower temperatures, the lithium sulfate may remain in solution; and, increasing the crystallizer bleed rate may remove the lithium sulfate from the crystallizer and prevent it from coming out of solution with the crystallizing metal sulfate(s). Alternatively, if the crystallizer is operated under different temperature conditions while maintaining the same bleed rate, different levels of lithium contaminations may be obtained. In contrast, the solubility of sodium increases with increasing temperatures. As such, if the crystallizer is operated at higher temperatures, the sodium may remain in solution; and increasing the crystallizer bleed rate may remove the sodium from the crystallizer before it can come out of solution with the crystallizing metal sulfates. However, if the crystallizer is operated at lower temperatures, the sodium remaining in the mother liquor may precipitate, due to its lower solubility, or may react with nickel to form double salts that can impact the purity of the crystallized metal sulfates.

Impurity solubility can also be dependent on the amount of free water present in the PLS and/or mother liquor; therefore, managing water levels in the crystallizer can be an effective means of managing the purity of the metal sulfate(s) being crystallized. For example, in some instances, the metal sulfates crystallize out of solution as metal-sulfate hydrates (i.e., crystallized metal sulfates and water molecules combined in a definite ratio as an integral part of the crystal), which reduces the concentration of water in the mother liquor. By decreasing the concentration of free water, the concentration of impurities (e.g. lithium, sodium, potassium, magnesium, etc.) in the mother liquor may also increase to the point that they crystallize out of solution and impact the purity of the crystallized metal sulfates. However, if a sufficient amount of water is added to the PLS and/or mother liquor when in the crystallizer, or if that amount of excess water remains in the PLS after upstream treatment (e.g., at least as much water as is expected to be lost due to hydrate formation), the presence of that free water can inhibit the crystallization of impurities out of solution.

The crystallized metal sulfates may be isolated from the mother liquor by discharging them from the crystallizer. For example, the crystallized metal sulfates may be discharged as a slurry that is passed to a filter or centrifuge to separate the crystals from the mother liquor. The filtrate or centrate (i.e., mother liquor) may then be passed back to the crystallizer, or a fraction of it may be bled; and the isolated crystals may be washed on the filter or centrifuge and dried. In some instances, using only one crystallizer is insufficient to produce suitably pure, crystallized metal sulfates, such as when the PLS is formed from dirtier feedstocks. Crystals discharged from a first crystallizer may then be dissolved in water (e.g., pure water) before being introduced into a second crystallizer to be recrystallized and further purified.

In one or more embodiments of the process described herein, the process comprises crystallizing a metal sulfate from an aqueous solution to form a crystallized metal sulfate as described and depicted in: Example 1 and FIG. 2/FIG. 2a (e.g., see NMC Crystallisation); Example 2 and FIG. 3 (e.g., see Cobalt and Manganese Sulfate Crystallization, Nickel Sulfate Crystallization); Example 3 and FIG. 4 (e.g., see Cobalt/Manganese Crystallization, Nickel Sulfate Crystallization); Example 4 and FIG. 5 (e.g., see NMC Crystallisation); Example 5 and FIG. 7 (e.g., see Cobalt Crystallization); and Example 7 and FIG. 6 (e.g., see Nickel and Cobalt Crystallization Circuit).

Basification

The process described herein comprises basifying a portion of the mother liquor to convert an uncrystallized metal sulfate to a basic metal salt. In one or more embodiments of the process described herein, the process comprises basifying the portion of the mother liquor using a second neutralizing agent to convert the uncrystallized metal sulfate to the basic metal salt. In one or more embodiments, converting the basic metal salt back to the uncrystallized metal sulfate comprises using the basic metal salt as a first neutralizing agent to neutralize acid upstream of crystallizing the metal sulfate. In one or more embodiments, basifying and salt recovery is depicted in FIG. 1 or FIG. 2a (see 'Basic Metal Salt Precipitation' and 'Salt Recovery' or 'Basifying').

The crystallization mother liquor contains uncrystallised metal sulfates, in addition to other impurities and components, like salts and metals such as $Li_2SO_4$, $Na_2SO_4$, etc. To selectively recover these uncrystallised metal sulfates and to form basic metal salt(s) for use up-stream as neutralizing agents (also referred to herein as first neutralizing agents), the mother liquor is bled from the crystallizer and basified in order to convert the uncrystallised metal sulphates remaining in the mother liquor to said basic metal salts, such as metal hydroxides (e.g., $Ni(OH)_2$, $Co(OH)_2$, $Mn(OH)_2$, etc.). When basifying the mother liquor, enough base may be added to increase the pH level to between 7.5-10, or between 7.5-9.5. The resultant metal hydroxides precipitate from the mother liquor, and may be isolated from the mother liquor via filtration and washed to form a cake, and may be re-pulped to form a slurry. For example, the metal hydroxides may be recovered by filtration, thickening and filtration, or centrifugation, and then washed on the filter or centrifuge to form the cake. At least a part of the cake may be passed to a re-pulp tank to be slurried using water or process solutions. The metal hydroxides may be selectively precipitated from the mother liquor; for example, via a one-stage or two-stage precipitation circuit. The precipitation circuits can be used to selectively precipitate the metal hydroxides from impurities in the metal hydroxides due to their presence in the mother liquor.

The metal hydroxides are introduced up-stream in the process and are used as a neutralizing agent to neutralize acids introduced at the leaching and/or refining stages. For example, about 0% to 40% of the metal hydroxides (e.g., as a cake) may be introduced into the leaching stage; and about 60% to 100% of the metal hydroxides (e.g., as a cake) may be introduced into the refining stages. Using the metal hydroxides as a neutralizing agent reduces and/or eliminates the need to introduce external neutralizing agents; this reduces reagent use (and associated costs), and reduces and/or eliminates additional sources of impurities that may impact product purity (e.g., cations $Na^+$, $K^+$, $Li^+$, $Ca^{2+}$, $Mg^{2+}$ from the external neutralizing agent), and would otherwise require the crystallizer bleed rate to be higher to avoid co-precipitation of the impurities and contamination of the crystallized metal sulfates. In some instances, to ensure that there is a sufficient amount of basic metal salts, e.g., metal hydroxides, available for use as a neutralizing agent, the rate at which the mother liquor is bled from the crystallizer and basified to form the metal hydroxides may be controlled such that the amount of metal hydroxides formed is at least approximately equivalent to, or approximately equivalent to the amount of acid introduced at the leaching and/or refining stages. For example, if the refined PLS is of high purity, the crystallizer bleed rate may not need to be very high to manage the purity of the crystallized metal sulfates (e.g., as described above); however, the crystallizer bleed rate may nonetheless need to be increased to ensure a sufficient amount of metal hydroxides are formed for use upstream. In other instances, the rate at which the mother liquor is bled from the crystallizer and basified to form the metal hydroxides may be controlled such that the amount of metal hydroxides formed in combination with an added amount of external neutralizing agent is at least approximately equivalent to, or approximately equivalent to the amount of acid introduced at the leaching and/or refining stages; however, the amount of external neutralizing agent added would be kept sufficiently low such that use of the external neutralizing agent didn't introduce impurities (e.g., cations $Na^+$, $K^+$, $Li^+$, $Mg^{2+}$, etc.) at a concentration that would impact the purity of the crystallized metal sulfates. In such instances, a combination of the formed metal hydroxides and external neutralizing agent may be used to manage capital and/or operating costs. Further, the rate at which the metal hydroxides are metered to an upstream process may be controlled by a pH setpoint for said process (e.g., leaching, refining, etc.).

Further, using the basic metal salts (e.g., metal hydroxides) as a neutralizing agent converts the basic metal salts back to metal sulfates within the refined PLS. The refined PLS, comprising the converted metal sulfates, then proceeds on to the crystallizer, wherein the converted metal sulfates may be crystallized and isolated from the mother liquor. This loop of isolating and basifying the mother liquor to convert uncrystallised metal sulfates in solution to basic metal salts, and using those basic metal salts as neutralizing agents to convert the basic metal salts back to metal sulfates that can then be isolated via crystallization, can improve the yield of isolated, crystallized metal sulfates obtained from a particular feedstock.

In addition to using the basic metal salts, e.g., metal hydroxides, as a neutralizing agent, the process may use external sources of neutralizing agents (e.g., added oxides, hydroxides, etc.) in the refining stages to neutralize acids, and/or to basify the mother liquor bleed coming out of the crystallizer (also referred to herein as second neutralizing agents). Selecting the type(s) and amount(s) of external neutralizing agent may depend, at least in part, on the nature of the refining stages, and the type of metal sulfate and other components in the mother liquor. As a skilled person would recognize, there are different types of external neutralizing agents that would be suitable for use in the refining stages, and/or for use in basifying the mother liquor. Suitable external neutralizing agents include, but are not limited to, potassium hydroxide (KOH), calcium hydroxide ($Ca(OH)_2$), sodium hydroxide (NaOH), lithium hydroxide (LiOH), or magnesium oxide (MgO). For example, any one or combination of potassium hydroxide (KOH), calcium hydroxide ($Ca(OH)_2$), sodium hydroxide (NaOH), lithium hydroxide (LiOH), and magnesium oxide (MgO) may be used as an external neutralizing agent. A skilled person would also recognize that there are types of external neutralizing agents that would be less suitable for use in the refining stages and/or for use in basifying the mother liquor. For example, use of ammonia as an external neutralizing agent may result in the formation of double salts, such as nickel-ammonium sulfate salts, or metal complexes, such as or Ni and/or Co complexes. Such cations, salts or complexes can make processes non-feasible, and/or increase operational and capital costs due to requisite solvent extraction circuits.

The amount of external neutralizing agent may be selected depending on the nature of the refining stages. For example, if there is a high concentration of Cu that needs to be removed in a refining stage, then a high concentration/volume of neutralizing agent may be needed to neutralize any acid generated in a copper solvent extraction stage. Further, if there is a high concentration of Fe that needs to be removed in a refining stage, then a high concentration/volume of neutralizing agent will be needed to increase the pH and remove the Fe by hydrolysis.

The type of external neutralizing agent may be selected to generate and recover, via a salt recovery step, a particular by-product, such as a by-product that has commercial value. For example, if the external neutralizing agent is selected to be potassium hydroxide, then its use would generate potassium sulfate ($K_2SO_4$), a fertilizer. If the external neutralizing agent is selected to be calcium hydroxide, then its use would generate gypsum ($CaSO_4.2H_2O$), a product that may be disposed of as waste, or used in dry-wall and construction. If the external neutralizing agent is selected to be magnesium oxide (MgO), then its use would generate magnesium sulfate. If the external neutralizing agent is selected to be lithium hydroxide (LiOH), then its use would generate lithium sulfate.

The type of external neutralizing agent may also be selected based on its ability to be recovered, via a salt recovery step, and regenerated, so that the neutralizing agent can be used in the process, and then regenerated for re-use. For example, if the external neutralizing agent is selected to be sodium hydroxide, then its use would generate sodium sulfate as a by-product. Sodium hydroxide can be regenerated from sodium sulfate via electrolysis. In general, electrolysis can directly convert the by-product sodium sulfate back to sodium hydroxide for re-use in the process, producing sulfuric acid during the conversion. More particularly, electrolysis uses an applied electric potential and one or more ion selective membrane(s) to regenerate an acid and a base from a salt solution, and is conducted using an electrochemical cell that can comprise two or more compartments separated with selective membrane(s). For example, the electrolysis may involve a 3-compartment cell operating under 6V of potential with a current density between 1500-3000 $A/m^2$, which would be able to produce an approximately 20 wt % solution of sodium hydroxide along with an approximately 10 wt % solution of sulfuric acid from sodium sulfate, both of which can be recycled for use upstream in the process. If the external neutralizing agent is selected to be LiOH, then its use would generate lithium sulfate that could be converted back to LiOH using a downstream recovery step such as basification and crystallisation, or electrolysis, or could be converted to lithium carbonate as a saleable product.

In one or more embodiments of the process described herein, the process comprises basifying a portion of the mother liquor to convert an uncrystallized metal sulfate to a basic metal salt as described and depicted in: Example 1 and FIG. 2/FIG. 2a (e.g., see Nickel, Cobalt and Manganese Recovery); Example 2 and FIG. 3 (e.g., see Cobalt & Manganese Hydroxide Precipitation, Nickel Hydroxide Precipitation); Example 3 and FIG. 4 (e.g., see Cobalt and Manganese Recovery, Nickel Hydroxide Precipitation, To Potassium Sulfate Production); Example 4 and FIG. 5 (e.g., see Nickel, Manganese, Cobalt (NMC) Precipitation, To Potassium Sulfate Production); Example 5 and FIG. 7 (e.g., see Cobalt Hydroxide Precipitation, To Sodium Sulfate Plant); and Example 7 and FIG. 6 (e.g., see Nickel and Cobalt Precipitation Circuit, To Potassium Sulfate Production).

Process for Generating a Metal Sulfate

In one or more embodiments of the present disclosure, the process described herein provides the selective crystallization or co-crystallization of any one or combination of nickel sulfate ($NiSO_4$), cobalt sulfate ($CoSO_4$), manganese sulfate ($MnSO_4$), and lithium sulfate ($Li_2SO_4$). In one or more embodiments, the process described herein provides the selective crystallization or co-crystallization of one or two of crystalized nickel sulfate ($NiSO_4$), cobalt sulfate ($CoSO_4$), and manganese sulfate ($MnSO_4$). In one or more embodiments, the process described herein provides the selective co-crystallization of all three of crystalized nickel sulfate ($NiSO_4$), cobalt sulfate ($CoSO_4$), and manganese sulfate ($MnSO_4$). In one or more embodiments, the process described herein provides battery-grade, crystallized metal sulfates. In one or more embodiments, the process provides electroplating-grade, crystallized metal sulfates. In one or more embodiments, the process described herein does not use solvent extraction circuits to isolate battery-grade, crystallized metal sulfates. In one or more embodiments, the process described herein reduces capital and operating costs; increases yield of crystallized metal sulfates; and/or reduces or eliminates sodium sulfate as a solid waste (when sodium hydroxide is used as an external neutralizing agent, and the sodium sulfate is converted back to sodium hydroxide via electrolysis, or where the amount of external neutralising agent required is reduced).

In some embodiments, the process described herein reduces capital and operating costs because it uses a crystallizer to isolate crystallized metal sulfates, in place of solvent extraction circuits. While crystallization requires energy input, it does not require use of added reagents, thereby reducing operating costs. Further, the capital costs associated with crystallization are lower than those associated with solvent extraction circuits.

In other embodiments, the process described herein reduces capital and operating costs by reducing reagent use. For example, a nickel solvent extraction circuit to form nickel sulfate requires the consumption of 1 mole of sulfuric acid and 2 moles of sodium hydroxide per mole of nickel sulfate produced. In contrast, crystallization does not require the use of any added reagents. The process described herein can reduce reagent use even if a solvent extraction step is used as part of the refining stage, as said solvent extraction will generally experience a smaller load (i.e., impurities at lower concentrations), and so will require less acid and base.

In some embodiments, the process described herein reduces capital and operating costs by reducing the number of processing steps. Reducing the number of process steps not only reduces capital and operating costs, it also reduces the complexity of the process, and therefore reduces the complexity of the infrastructure and skillsets needed to conduct the process. For example, solvent extraction is a relatively complex unit operation requiring multiple stages of extraction, scrubbing, and stripping; and requiring systems for treatment of aqueous discharge streams, crud removal, organic vapor recovery, and fire protection. By using a crystallizer to isolate crystallized metal sulfates, in place of solvent extraction circuits, such process complexity (and associated costs) can be avoided.

In other embodiments, the process described herein increases yield of crystallized metal sulfates by reducing or preventing the addition of specific impurities or components in the leaching and/or refining stages of the process, such as lithium, sodium, potassium, or magnesium. For example, as the one-pass yield of crystallized metal sulfates increases in the crystallizer, the concentrations of impurities such as lithium, sodium, etc. in the mother liquor also increases. As a result, the crystallizer bleed rate must also increase to manage the purity of the crystallized metal sulfates (for example, by inhibiting or preventing the impurities from approaching their saturation concentrations in the mother liquor). However, increasing the crystallizer bleed rate may create inefficiency, as the bled uncrystallised metal sulfates will be basified and precipitated, consuming reagents. As such, reducing or preventing the addition of these impurities in the leaching and/or refining stages of the process means the crystallizer can be operated at a lower bleed rate while avoiding co-crystallization of impurities with the metal sulfates, which can improve the one-pass yield of crystallized metal sulfates while also decreasing operational costs. In one or more embodiments of the process of the present disclosure, the addition of specific impurities (e.g., lithium, sodium, magnesium, etc.) is reduced or prevented by using the basic metal salts (e.g., the metal hydroxides $Ni(OH)_2$, $Co(OH)_2$, $Mn(OH)_2$, etc.) precipitated from the mother liquor that is bled from the crystallizer. In some embodiments, precipitation and washing of the basic metal salts is carefully controlled (e.g., by selection of pH levels, use of two-stage precipitation circuits, etc.) to reduce or prevent precipitating impurities (e.g., lithium, sodium, magnesium, etc.) into the basic metal salts.

In some embodiments, the process described herein increases yield of crystallized metal sulfates by using a loop of isolating and basifying crystallization mother liquors to convert uncrystallised metal sulfates in solution to basic metal salts (e.g., metal hydroxides), and using those basic metal salts as neutralizing agents to convert the salts back to metal sulfates for crystallization. The iterative nature of the loop ensures a very good recovery of crystallized metal sulfates.

In other embodiments, the process described herein reduces or eliminates sodium sulfate as a waste stream by regenerating sodium hydroxide from sodium sulfate. Sodium sulfate is a by-product with a marketability that is generally concerned to be poor, with the potential to be a costly waste issue, both from an environment and financial standpoint.

To gain a better understanding of the invention described herein, the following examples are set forth. It should be understood that these examples are for illustrative purposes only. Therefore, they should not limit the scope of this disclosure in anyway.

EXAMPLES

Example 1

In an embodiment of the process described herein, the following describes a hydrometallurgical process designed to process recycle metals from black mass including Ni, Co, Mn and Li, and produce a material suitable for battery production. The major process steps involved are described in the following sections and are depicted in FIG. 2.

Leaching

Black Mass Leaching and NMC Leach

Black mass with an approximate chemical composition as delineated in Table 1.0 below was fed to the Black Mass Leaching Circuit at a feed rate of 4.3 metric tonnes per hour, was leached in a series of atmospheric reactors using a pre-cooled diluted acid stream and hydrogen peroxide in order to achieve complete dissolution of valuable metals such as nickel, cobalt and lithium. This leaching was controlled to obtain a suitable oxidation-reduction potential (ORP) for facilitating leaching of high oxidation components, including manganese and cobalt. During this step, graphite in the black mass ended up in the leaching residue, which was filtered and washed and separated using a vacuum belt filter. The strong filtrate from the filter was transferred to an NMC Hydroxide releach step, while the weak filtrate wash from the filter was returned to Black Mass Leaching. An example of the chemical composition of the strong filtrate for NMC Hydroxide releach is delineated below in Table 2.0. In the NMC Hydroxide releach, any excess NMC hydroxides from a downstream NMC Recovery Circuit were re-solubilized when neutralized with sulfuric acid (see below). The temperature of the black mass and releach reactors was controlled at 65° C. via an external recirculating cooling system. Dust and deleterious vapours from the leaching tanks were collected in a packed column scrubber that used diluted NaOH to strip these compounds prior to further treatment and discharge. The resultant NMC liquor from the releach passed to a downstream Copper Solvent Extraction Circuit via a Fluoride Removal Circuit.

Copper SX

Copper Solvent Extraction

Copper Solvent Extraction (Cu SX) recovered Copper from a pregnant leach solution flow of about 15 m$^3$/h (PLS; see Leaching) before it underwent further treatment to recover nickel, cobalt and manganese. The extractant reagent used in this SX circuit was LIX 860N-I or an organic with similar properties. The copper-rich PLS was fed to an organic removal step to prevent residual organics from the black mass leaching coming into contact with the copper solvent extraction reagents which leads to contamination of the SX organic and degradation of performance. This was achieved by using a multi-media filter consisting of a structured packing to coalesce the bulk of the entrained organic. Below the packing was a bed of anthracite on a bed of finer grained garnet. The anthracite and garnet removed solids and acted as further coalescing media for the organic. During operation, the organic raised up and collected at the top of the filter where it was purged from the process. Solids retained in the unit were removed through a backwash and filtration step where the filter cake was discharged into a container for disposal. Finally, the PLS was fed to a Granulated Activated Carbon (GAC) Column Unit where the residual organic content in the treated aqueous was discharged at less than 1 ppmv prior to being fed to the Extraction circuit. As an alternative, or supplementary to this, an organic wash stage or an evaporation/distillation stage is used to remove entrained organic sourced from black mass leaching.

The copper in the PLS was loaded in three Cu SX extraction stages, and it was scrubbed using a portion of an acidic strip solution. Scrubbing of the organic was performed in two stages to remove mainly iron that was loaded on the organic during extraction. The scrubbed aqueous solution returned to the extraction circuit.

The copper and some residual ferric ion that were loaded on the organic were stripped using sulfuric acid solution. The copper sulfate rich strip liquor was fed to an organic treatment step to remove any residual organics prior to being sent to an Electrowinning plant to produce Copper Cathode Material.

TABLE 1.0

Chemical Composition of Black Mass
Composition of major elements (wt %)

| Black Mass | Ni | Co | Mn | Li | Na | C | Fe | Al | Cu | Mg | Zn | P | F |
|---|---|---|---|---|---|---|---|---|---|---|---|---|---|
| # 1 | 1.7 | 31.2 | 2 | 3.7 | 0.1 | 31.5 | 0.5 | 3.5 | 2.9 | 0.1 | 0.1 | 0.4 | 1.5 |
| # 2 | 21.3 | 4.34 | 0.2 | 3.4 | 0.1 | 37 | 0.1 | 1 | 0.7 | <0.1 | <0.1 | 0.7 | 1.5 |
| # 3 | 12.1 | 2.9 | 3.5 | 2.5 | 0.1 | 56 | <0.1 | 1.4 | 1.3 | <0.1 | <0.1 | 0.3 | 1.9 |
| # 4 | 21.3 | 18.4 | 16.9 | 6.4 | <0.1 | 10.4 | <0.1 | <0.1 | 0.6 | <0.1 | <0.1 | 0.7 | 1.5 |

TABLE 2.0

Chemical Composition of Strong filtrate for NMC Hydroxide Releach
Composition of major elements (g/L)

| | Ni | Co | Mn | Li | Na | C | Fe | Al | Cu | Mg | Zn | P | F |
|---|---|---|---|---|---|---|---|---|---|---|---|---|---|
| Strong Filtrate Composition | 59.9 | 12 | 0.5 | 9.5 | <0.1 | 0 | 0.3 | 2.7 | 2.1 | <0.3 | <0.2 | 1.8 | 2.2 |

The raffinate solution from extraction was also fed to an organic treatment step prior to advancing to the Impurity Removal Circuit.

See FIG. 2 (Cu SX).

Impurity Removal

Impurity Precipitation, Fe/Al Re-Leach and Precipitation

The raffinate solution from Copper Solvent Extraction was fed to a Precipitation Step where NMC hydroxides produced downstream were used as the neutralization agent to react with the free acid, iron and aluminium sulfate present. The reactors were air sparged to ensure all iron was oxidised to the ferric form. Iron and aluminium precipitated as hydroxides. In the reactors, the NMC hydroxides were almost completely converted back to metal sulfates.

The slurry from the impurity precipitation tank was pumped to a filter press where the impurity metal hydroxide cake was separated and transferred to a re-leach process. The filtrate was fed to a polishing filtration step to remove any fine particles from the solution prior to feeding the downstream Impurity Ion Exchange Circuit.

The cake fed to the re-leach circuit was mixed with a sulfuric acid solution which dropped the pH to about 1.5 to dissolve any residual NMC solids present in the cake. Within the same reactor train the system was basified to increase the pH to about 4 to 5.5 to facilitate the re-precipitation of iron and aluminum. The resultant slurry was subsequently fed to a filter press where the cake was removed as a residue and the filtrate was recovered back into the process. See FIG. 2 (Fe/Al Precipitation).

Impurities Ion Exchange

Impurity Ion Exchange

Purpose of Impurity Ion Exchange (IX) was to remove zinc and residual copper from the purified PLS before it underwent further treatment to recover cobalt, nickel and manganese. The ion exchange feed was pre-conditioned with dilute acid to adjust the feed pH to approximately 3 prior to loading the columns.

The Ion Exchange columns were packed with Lewatit VP OC 1026, or an equivalent ion exchange resin which has a high affinity for zinc. Zinc and other trace impurity metals loaded onto the resin at these conditions, while the NMC rich solution passed through the circuit onwards to the NMC Crystallization Circuit. See FIG. 2 (Impurity IX Circuit).

NMC Crystallisation

Nickel/Cobalt/Manganese Sulphate Crystallisation

Purpose of NMC evaporator/crystallisers was to purify the NMC sulphate metals by crystallising them out of solution while leaving behind $Li_2SO_4/MgSO_4$ in the mother liquor. The effluent from the upstream Impurity Ion Exchange Circuit was pre-conditioned using a dilute sulfuric acid solution to obtain a pH of 1 prior to feeding the NMC Crystallization Circuit. The circuit consisted of a forced circulation (FC) evaporator where flash vapor produced was compressed by a mechanical vapor recompression (MVR) fan. The compressed vapor provided the heat to drive evaporation in the unit that operated at 65° C. Water was flashed in the evaporator to concentrate the solution to ~10-15 g/L Li prior to the subsequent cooling crystallization steps.

The resultant slurry was pumped from the evaporator recirculation leg to a set of vacuum flash crystallisers which gradually reduced the temperature to 20° C. As the solution was flash cooled, more water was evaporated which facilitated the crystallization of mainly nickel, manganese and cobalt as hydrated sulfates while leaving the primary impurities predominantly in the mother liquor.

The resulting slurry was then further cooled in a surface cooled crystallizer unit using an external cooling loop to temperatures as low as 0° C. (higher temperatures could be used). The reduced solubility of the NMC constituents in the liquor at lower temperatures resulted in additional crystal product. The total crystallised metal sulphate product was fed to a belt filtration unit and washed. The NMC sulfate cake was then re-dissolved by mixing with demineralized water to 120 g/L (of combined NMC) and fed to the downstream Battery Cathode facility. Some or all of the filtrate was bled to the NMC recovery circuit. This was the crystallizer circuit bleed. Additional mother liquor is also bled if the process conditions dictate. See FIG. 2 (NMC Crystallization Circuit). See Table 3.0 for an example of a mass balance of the NMC crystallization step, including the crystallizer process conditions, crystallizer unit feed stream, the crystallizer circuit bleed stream, the crystallized metal sulfate product stream, and recovery rate.

TABLE 3.0

Mass Balance of a NMC Crystallization Step
Composition of major elements

| | Ni | Co | Mn | Li | Na | C | Fe | Al | Cu | Mg | Zn | P | F |
|---|---|---|---|---|---|---|---|---|---|---|---|---|---|
| Feed to Evaporator/crystallizer (g/L) | 58.7 | 19.8 | 49.6 | 8.4 | 0.8 | 0 | 0 | 0 | 0 | 0.3 | 0 | 1 | 0 |
| Crystalliser bleed (g/L) | 35.3 | 10.7 | 110 | 27.5 | 2.8 | 0 | 0 | 0 | 0 | 0.8 | 0 | 2.1 | 0 |
| Crystals after separation and wash (wt %) | 11.4 | 4.8 | 4.5 | 0.2 | 0.3 | 0 | 0 | 0 | 0 | 0 | 0 | 0 | 0 |
| Evaporation rate % (Evaporated mass/total initial mass) | 37 | | | | | | | | | | | | |
| Evaporation temperature (° C.) | 40 | | | | | | | | | | | | |
| Cooling crystallisation temperature- Crystallizer bleed temp (° C.) | 0 | | | | | | | | | | | | |
| One pass through recovery rate % | 52-60 | | | | | | | | | | | | |

Nickel, Cobalt and Manganese Recovery

Purpose of the High Li NMC Recovery circuit was to precipitate the nickel, cobalt and manganese from the crystalliser bleed (below the crystalliser saturation) as hydroxides. Sodium hydroxide was used as a pH modifier. The bleed from the NMC Crystallization was reacted in continuous stirred tank reactors with sodium hydroxide to operate at a pH of 8.5, which facilitated the precipitation of Nickel, Manganese and Cobalt as Hydroxides. The circuit consisted of a reactor train followed by a filtration unit. The combined filtrate and wash from the filter press was transferred downstream to the Lithium Recovery Process.

The washed cake product from the filter press consisted of the NMC hydroxides which were used as the neutralization agent for the upstream Fe/Al Precipitation Circuit to reduce the addition of sodium in the main process loop and improve the single pass conversion in the NMC Crystallization Circuit. Any excess NMC hydroxide was returned to the NMC Hydroxide Re-Leach and reacted with sulfuric acid to re-solubilize the metals as sulfates back into solution. See FIG. 2 (NMC Hydroxide Precipitation).

On a general level, a process for generating a metal sulfate as outlined in example 1 above may be described as follows, with reference to FIG. 2*a*.

A feedstock comprising material derived from recycled lithium ion batteries or lithium ion battery manufacturing scrap is first leached to form an aqueous solution comprising metal sulfates. In some variants, the feedstock may comprise at least 50% material derived from recycled lithium ion batteries or lithium ion battery manufacturing scrap, but other compositions of the feedstock are possible.

Optionally, one or more additional filtering and refining steps may be performed to filter the leachate and remove various impurities. As described above in connection with example 1, these steps may include filtration, fluoride removal, copper removal, and removal of aluminium, iron and zinc. FIG. 2*a* illustrate these steps conceptually as a single "Refining" stage.

A crystallization step is then performed wherein metal sulfate, which comprises nickel sulfate, cobalt sulfate, and manganese sulfate, are crystallized from the aqueous solution to form crystallized metal sulfate in a mother liquor. The mother liquor also comprises an uncrystallized metal sulfate. During the crystallization step, the mother liquor is bled and the bleed rate is controlled to selectively inhibit crystallizing a lithium impurity when crystallizing the metal sulfate. In some variants of the method, this may result in crystallized metal sulfates that are substantially free of lithium. For example, the crystallized metal sulfates may contain less than 2% by weight of lithium, or in some variants less than 1% or less than 0.5%.

In some variants of the method, the crystallization step is performed at a pH level in the range or 0-5, and in particular variants in the range of 1.5-2.5.

The crystallized metal sulfate is then separated from the mother liquor.

A portion of the mother liquor is basified to convert the uncrystallized metal sulfate to a basic metal salt comprising nickel hydroxide, cobalt hydroxide and manganese hydroxide. Basifying may be done in different ways, but in some variants comprises adding a base comprising a hydroxide of an alkali metal or alkaline earth metal, in particular sodium hydroxide. In some examples, adding the base increases the pH level to a range of 7.5-10, in particular examples 7.5-9.5.

The basic metal salt is then used upstream of crystallizing the metal sulfate where it may be used as a neutralizing agent.

In some variants, the basifying step includes removing the basic metal salt from the mother liquor as a cake. For example, a first portion of the cake, e.g. up to 40%, may be used upstream when leaching the feedstock. Another portion of the cake, e.g. 60% or more, may be used in the refining stage, e.g. added in the Fe and Al removal stage. It is also possible to use the entire cake in the refining stage.

The crystallized metal sulfates may be of battery-grade quality and suitable for subsequent production of new battery materials.

Example 2

In an embodiment of the process described herein, the following describes a hydrometallurgical process for the recovery of a cobalt and manganese sulfate solution and a nickel sulfate solution produced from a nickel, manganese, cobalt and lithium-containing feedstock using Co/Mn solvent extraction, Co/Mn crystallization, and Ni crystallization. Particularly, the following describes a process involving a black mass leaching stage, followed by an impurity removal stage, Co/Mn removal stage, Co/Mn crystallization stage, and a selective nickel crystallization against lithium. The major process steps involved, along with variants of unit operations, are depicted in the block-flow diagram of FIG. 3.

Leaching

Black Mass Leaching and NMC Leach

Black mass feed was leached in a series of atmospheric reactors using a pre-cooled diluted acid stream and hydrogen peroxide in order to achieve complete dissolution of valuable metals such as Ni, Co, and lithium. This leaching was controlled to obtain a suitable oxidation-reduction potential (ORP) for facilitating leaching of high oxidation components, including manganese and cobalt. During this step, graphite in the black mass ended up in the leaching residue, which was filtered and washed and separated using a vacuum belt filter. The strong filtrate (from the filter) was transferred to an NMC Hydroxide releach step, while the weak filtrate (wash from the filter) was returned to Black Mass Leaching. In the NMC Hydroxide releach, any excess NMC hydroxides from a downstream NMC Recovery Circuit were re-solubilized when neutralized with sulfuric acid (see below). The temperature of the black mass and releach reactors was controlled at 65° C. via an external recirculating cooling system. Dust and deleterious vapours from the leaching tanks were collected in a packed column scrubber that used diluted NaOH to strip these compounds prior to further treatment and discharge. The resultant NMC liquor from the releach passed to a downstream Copper Solvent Extraction Circuit via a Fluoride Removal Circuit.

Copper SX

Copper Solvent Extraction

Copper Solvent Extraction (Cu SX) recovered Copper from a pregnant leach solution (PLS; see Leaching) before it underwent further treatment to recover nickel, cobalt and manganese. The extractant reagent used in this SX circuit was LIX 860N-I or an organic extractant with similar properties. The copper-rich PLS was fed to an organic removal step to prevent residual organics from the black mass leaching coming into contact with the copper solvent extraction reagents which leads to contamination of the SX organic extractant and degradation of performance. This was achieved by using a multi-media filter consisting of a structured packing to coalesce the bulk of entrained organic. Below the packing was a bed of anthracite on a bed of finer grained garnet. The anthracite and garnet removed solids and acted as further coalescing media for the organic.

During operation, the organic raised up and collected at the top of the filter where it was purged from the process. Solids retained in the unit were removed through a backwash and filtration step where the filter cake was discharged into a container for disposal by others. Finally, the PLS was fed to a Granulated Activated Carbon (GAC) Column Unit where the residual organic content in the treated aqueous was discharged at less than 1 ppmv prior to being fed to the Extraction circuit. As an alternative, or supplementary to this, an organic wash stage or an evaporation/distillation stage is used to remove entrained organic sourced from black mass leaching.

The copper in the PLS was loaded in three Cu SX extraction stages, and it was scrubbed using a portion of an acidic strip solution. Scrubbing of the organic was performed in two stages to remove mainly iron that was loaded on the organic during extraction. The scrubbed aqueous solution returned to the extraction circuit.

The copper and some residual ferric ion that were loaded on the organic extractant were stripped using sulfuric acid solution. The copper sulfate rich strip liquor was fed to an organic treatment step to remove any residual organics prior to being sent to an Electrowinning (EW) plant to produce Copper Cathode Material.

The raffinate solution from extraction was also fed to an organic treatment step prior to advancing to the Impurity Removal Circuit.

Impurity Removal

Impurity Precipitation, Fe/Al Re-Leach and Precipitation

The raffinate solution from Copper Solvent Extraction was fed to a Precipitation Circuit where NMC hydroxides produced downstream were used as the neutralization agent to react with the free acid, iron and aluminium sulfate present. The reactors were air sparged to ensure all iron was oxidised to the ferric form. Iron and aluminium precipitated as hydroxides at approximately pH 5-5.5. In the reactors, the NMC hydroxides were almost completely converted back to metal sulfates. The slurry from the impurity precipitation tanks was pumped to a filter press where the impurity metal hydroxide cake was separated and transferred to a re-leach process. The filtrate was fed to a polishing filtration step to remove any fine particles from the solution prior to feeding the downstream Co/Mn Solvent Extraction circuit.

The cake fed to the re-leach circuit was mixed with a sulfuric acid solution which dropped the pH to about 1.5 to dissolve any residual NMC solids present in the cake. Within the same reactor train the system was basified to increase the pH to about 4 to 5.5 to facilitate the re-precipitation of iron and aluminum. The resultant slurry was subsequently fed to a filter press where the cake was removed as a residue and the filtrate was recovered back into the process.

Co/Mn Solvent Extraction and Purification

Co/Mn Solvent Extraction

The purpose of Co/Mn SX is to separate Cobalt and Manganese from a Nickel containing liquor while further removing residual impurities in the Co and Mn rich strip liquor prior to Crystallization.

The extractant used in this SX circuit is commercially available Cyanex 272 (Bis(2,4,4 Trimethlpentyl) Phosphenic Acid) diluted in a high flash point aliphatic solvent (referred through herein as the organic or organic extractant).

Recycled Nickel Sulfate from the downstream Nickel Crystallization Circuit was used to Pre-load the Stripped Organic extractant to an extent, and subsequently supplemented with sodium hydroxide for pH control, additional loading, and to neutralize free acid generated from loading.

The raffinate from the Pre-Loading Step containing the non-loaded metal sulfates was fed to the Ni Hydroxide Precipitation Step.

In extraction, cobalt, manganese, and trace nickel, as well as some residual impurities were extracted on the organic extractant. The loaded organic extractant was scrubbed to remove weakly affiliated impurities before the Cobalt and Manganese were stripped from the organic extractant with a sulfuric acid solution. A portion of the Cobalt strip solution was used for scrubbing, with the balance being directed to organic treatment to reduce residual organics to less than 1 ppmv prior to being directed to the Cobalt & Manganese Purification Circuit/Impurity Removal Circuit. The nickel-rich raffinate stream from extraction was also fed to an organic treatment step prior to advancing onwards to the Nickel Recovery Process.

The organic-free Co/Mn-rich strip liquor was fed to a Zinc Ion Exchange Process at pH 3 (see Impurity Removal Circuit). The Ion Exchange columns were packed with Lewatit VP OC 1026 or an equivalent ion exchange resin which released hydrogen ions as they picked up zinc and any trace copper and iron ions from the Co/Mn-rich solution. The Co/Mn-rich solution was passed through the ion exchange columns where zinc, which has a high affinity for the resin, was loaded. The effluent solution at the column outlet was pumped to the Cobalt & Manganese Crystallization Circuit.

A dilute sulfuric acid eluent solution was used to strip the loaded zinc from the saturated resin. The zinc-rich eluate was fed to a reactor train where sodium hydrosulfide (NaHS) was added to precipitate zinc as a sulfide. The solids were separated in a filter press and directed to a drum for storage. The filtrate was then neutralized with excess cobalt and manganese hydroxide produced from a downstream Cobalt and Manganese Hydroxide Precipitation process which precipitated any residual metal impurities, which were then filtered and removed from the process. The recovered filtrate was combined with the Zn IX effluent and directed to the Cobalt and Manganese Sulfate Crystallization Circuit.

Cobalt and Manganese Sulfate Crystallization

The combined feed solution was acidified using a dilute sulfuric acid solution to achieve a target pH of <1.

The purpose of the Co/Mn Evaporation/Crystallization Circuit was to purify the Co/Mn sulfate by crystallizing them out of solution while leaving behind residual impurities (ex. Ni, Na, Mg, Li, & Ca) in the mother liquor.

The circuit consisted of a forced circulation (FC) evaporator where flash vapor produced was compressed by a mechanical vapor recompression (MVR) fan. The compressed vapor provided the heat to drive evaporation in the unit that operated at 80° C. Water was flashed in the evaporator to concentrate the solution and achieve a single pass conversion of combined cobalt and manganese that was least approximately equivalent to the acid generated upstream in the process.

The pregnant liquor was then fed to an Evaporative Crystallization Circuit that was operated under vacuum to flash cool the solution to 30° C. As the solution was flash cooled, more water was evaporated, forcing a combination of cobalt and manganese sulphate salts to crystallize out of solution. The crystals were discharged from the crystallizer and fed to a centrifuge where they were dewatered and washed. The cake was discharged into a tank, where it was re-dissolved using hot condensate from the evaporator/crystallizer to a target concentration of 120 g/L (Co+Mn).

The impurities that accumulate in the Co/Mn Crystallization mother liquor were controlled via a process bleed which was monitored and purged to ensure that crystallized solids product requirements were achieved.

Nickel Sulfate Crystallization

The nickel-rich raffinate from the Co/Mn Solvent Extraction process was acidified using sulfuric acid to a pH of 1 prior to feeding the Nickel Sulfate Evaporation Unit/Crystallization Circuit.

The circuit consisted of a forced circulation (FC) evaporative crystallizer where flash vapor produced was compressed by a mechanical vapor recompression (MVR) fan. The compressed vapor provided the heat to drive evaporation in the unit that operated at 80° C. Water was flashed in the evaporator to provide a crystallizer bleed rate such that when the bleed was basified it generated a quantity of NMC Hydroxide at least approximately equivalent to the acid generated upstream in the process.

The pregnant liquor was then fed to an Evaporative Crystallization Circuit that was operated under vacuum to flash cool the solution to 30° C. As the solution was flash cooled, more water was evaporated, forcing nickel sulphate salt to crystallize out of solution. The crystals were discharged from the crystallizer and fed to a centrifuge where they were dewatered and washed. The cake was discharged into a tank, where it was re-dissolved using hot condensate from the evaporator/crystallizer to a target concentration of Ni at 120 g/L.

The impurities that accumulated in the Ni Crystallization mother liquor (such as magnesium, sodium, etc) were controlled via a process bleed which was monitored and purged to ensure that crystallized solids product requirements were achieved.

Cobalt & Manganese Hydroxide Precipitation

The process bleed from the Cobalt and Manganese Sulfate Crystallization Circuit was fed to the Cobalt and Manganese Precipitation Circuit where sodium hydroxide was added to operate at pH of 8.5 which facilitated precipitation of Cobalt and Manganese as Hydroxides. The circuit consisted of a reactor train followed by a filtration unit. The filtrate and wash from the filter press were transferred downstream to the Lithium Recovery Plant.

The washed cake product from the filter press consisted of the cobalt and manganese hydroxides which were used as the neutralization agent for the Impurity and Iron/Aluminum Removal Circuits upstream to reduce addition of sodium into the main process loop and improve the single pass conversion in the Cobalt and Manganese Crystallization Circuit.

Nickel Hydroxide Precipitation

The raffinate from the Pre-Load Step and the nickel sulphate crystallizer bleed were fed to the Nickel Precipitation Circuit where sodium hydroxide was added to operate at pH of 8 which facilitated precipitation of nickel hydroxide. The circuit consisted of reactor train followed by a filtration unit. The filtrate and wash from filter press was transferred downstream to the Lithium Recovery Process.

The cake product from the filtration unit consisted mainly of Nickel hydroxide was used as a neutralization agent for Iron/Aluminum Removal Circuit to reduce addition of sodium into the main process loop and improve the single pass conversion in the Nickel Sulfate Crystallization Circuit. Any excess NMC hydroxide was returned to the NMC Re-Leach (See Leaching) and reacted with sulfuric acid to resolubilize the metals as sulfates back into solution.

Example 3

In an embodiment of the process described herein, the following describes another hydrometallurgical process for the recovery of a cobalt and manganese sulfate and a nickel sulfate produced from an NMC-containing feedstock using Co/Mn solvent extraction, Co/Mn crystallization, and Ni crystallization. Particularly, the following describes a process involving a matte leaching stage, with Co/Mn removal stage, Co/Mn crystallization, and Ni crystallization selective (or not) over potassium. The major process steps involved are depicted in the block-flow diagram of FIG. 4.

Matte Leach

Atmospheric Leach

The raw matte feedstock containing (by weight) copper— 29%, nickel—42%, iron—0.8% and cobalt—1.5% was fed to a Grinding Circuit at a feed rate of about 14 metric tonnes per hour. The resultant ground matte slurry was fed to a reactor train operating at 85° C. at atmospheric conditions, where it was mixed with spent electrolyte from the downstream Copper Electrowinning process. Oxygen was sparged into initial reactor tanks which promoted leaching of the matte. The nickel in the matte, which primarily exists as heazlewoodite ($Ni_3S_2$), reacted with the spent electrolyte and oxygen to form nickel sulfate in solution and some millerite (NiS) solids. No additional oxygen was introduced in the final tanks within the reactor train which facilitated the metathesis reactions between the copper sulfate present in the spent electrolyte, copper leached from the initial reactors tanks and the remaining nickel present as $Ni_3S_2$ to predominantly solubilize as nickel sulfate while generating mainly copper sulfide. The nickel rich solution was then separated from the remaining matte via a filtration step and proceeded to the Iron Removal Circuit. The remaining matte was sent to pressure oxidative leaching.

Pressure Oxidative Leaching

The objective of the pressure oxidative leaching step was to maximize the dissolution of copper-enriched matte from the atmospheric leaching circuit. The matte was mixed with spent electrolyte from electrowinning and concentrated sulfuric acid in an autoclave operating at 600 kPa and >130° C. Oxygen and cooling water were added directly to the autoclave. Any residue remaining after leaching, now concentrated in PGMs, was separated via a filtration step and sold to PGM refineries. The copper-rich filtrate was purified and cooled before proceeding to copper electrowinning.

Copper Removal

Copper Electrowinning

The copper-rich filtrate from the Pressure Oxidative Leaching Circuit is fed to the tankhouse where copper cathode material is produced. The spent electrolyte is recycled back to the atmospheric and pressure leach circuits.

Iron Removal

Iron Precipitation Circuit

The nickel-rich solution from the Atmospheric Leach was fed to reactor train, where nickel hydroxide and Co/Mn hydroxide produced downstream were used as the primary neutralization agents to raise the pH to about 4 to 5.5, where potassium hydroxide was used to supplement. The reactors were air sparged to ensure all iron was oxidized to the ferric form. At these conditions most of the iron was precipitated from the liquor, while the nickel and cobalt and manganese hydroxides were almost completely converted back to metal sulfates. The resultant slurry was fed to a thickener, where the underflow slurry was pumped to a bank of filter presses where mainly iron hydroxide residue was separated and transferred to a re-leach process step. The polished filtrate was combined with the thickener overflow and fed onwards to the Co/Mn Solvent Extraction Circuit.

In the re-leaching step, the residue cake was mixed with a sulfuric acid solution which dropped the pH to about 1.5 to dissolve any residual nickel and cobalt/manganese hydroxide solids present in the cake. Within the same reactor train the system was basified using potassium hydroxide to increase the pH to about 5 to facilitate the re-precipitation of iron. The resultant slurry was subsequently fed to a filter press where the cake was removed as a residue from the process and the filtrate was recovered back into the process to the Nickel Hydroxide Precipitation Circuit.

Cobalt/Manganese Solvent Extraction

Cobalt/Manganese Solvent Extraction

Purpose of Co/Mn solvent extraction was to separate Co/Mn from the Nickel-containing liquor while further removing residual impurities in the Co/Mn-rich strip liquor prior to Crystallization.

The organic extractant used in this SX circuit was commercially available Cyanex 272 (Bis(2,4,4 Trimethlpentyl) Phosphenic Acid) diluted in a high flash point aliphatic solvent.

Recycled Nickel Sulfate from a downstream Nickel Crystallization Circuit was used to Pre-load the Stripped Organic extractant to an extent, where potassium hydroxide was subsequently supplemented for pH control, additional loading, and to neutralize free acid generated from loading. The raffinate from the Pre-Loading Step containing the non-loaded nickel sulfate was fed to the Nickel Precipitation Step.

In extraction, cobalt and manganese, as well as some residual impurities were extracted on the organic extractant. The loaded organic extractant was then scrubbed to remove weakly affiliated impurities before the Co/Mn was stripped from the organic extractant with a sulfuric acid solution. A portion of the Co/Mn strip solution was then used for scrubbing with the balance being directed to organic treatment to reduce residual organics to less than 1 ppmv prior to being directed to a Purification Circuit/Impurity Removal Circuit. The nickel-rich raffinate stream from extraction was also fed to an organic treatment step prior to advancing onwards to the Nickel Crystallization Circuit.

The organic-free cobalt rich strip liquor was fed to a Copper Ion Exchange Process. The Ion Exchange columns were packed with Amberlite 718 or an equivalent ion exchange resin which released hydrogen ions as they picked up copper, trace nickel, and other impurities from the Co/Mn-rich solution. The Co/Mn-rich solution was passed through the ion exchange columns where copper with a high affinity for the resin was loaded. The Co/Mn-rich raffinate solution was then fed to a polishing precipitation step where Co/Mn hydroxide from a downstream precipitation step was used as the alkali source to raise the solution pH and precipitate any residual iron present. The residue was filtered, and the treated Co/Mn-rich solution was pumped to a Cobalt/Mn Crystallization Circuit. A sulfuric acid solution was used to elute the loaded copper from the saturated resin which was recycled upstream to the PDX Leaching Circuit.

Cobalt/Manganese Crystallization

The treated Co/Mn-rich solution from the upstream Impurity Removal Circuit was acidified using a dilute sulfuric acid solution to a target pH of <1.

The circuit consisted of a forced circulation (FC) evaporative crystallizer where flash vapor produced was compressed by a mechanical vapor recompression (MVR) fan. The compressed vapor provided the heat to drive evaporation in the unit that operated at 80° C. Water was flashed in the evaporator to concentrate the solution and achieve a single pass conversion of cobalt and manganese and that was at least approximately equivalent to the acid generated upstream in the process.

The pregnant liquor was then fed to an Evaporative Crystallization Circuit that was operated under vacuum to flash cool the solution to 30° C. As the solution was flash cooled, more water was evaporated, forcing cobalt and manganese sulphated hydrated salts to crystallize out of solution. The crystals were discharged from the crystallizer and fed to a centrifuge where they were dewatered and washed. The cake was discharged into a tank, where it was re-dissolved using hot condensate from the evaporator/crystallizer to a target concentration of 120 g/L (Co+Mn).

The impurities that accumulated in the Co/Mn Crystallization mother liquor were controlled via a process bleed which was monitored and purged to ensure that crystallized solids product requirements were achieved.

Cobalt and Manganese Recovery

The process bleed from the Co/Mn Sulfate Crystallization Circuit was fed to reactor train where potassium hydroxide was added and operated at pH 8.5 which facilitated the precipitation of mainly cobalt and manganese as hydroxides. The resultant slurry was fed to filtration unit where the solids were used as the precipitation agent in the Impurity Removal and Iron Removal Circuits upstream. The filtrate and wash from solid/liquid separation unit were pumped to the Potassium Sulfate Production Circuit.

Nickel Sulfate Crystallization

The nickel-rich raffinate from the Co/Mn Solvent Extraction process was acidified using sulfuric acid to a pH of 1 prior to feeding the Nickel Sulfate Crystallization Circuit.

The circuit consisted of a forced circulation (FC) evaporative crystallizer where flash vapor produced was compressed by a mechanical vapor recompression (MVR) fan. The compressed vapor provided the heat to drive evaporation in the unit that operated at 80° C. Water was flashed in the evaporator to provide a crystallizer bleed rate such that when the bleed was basified it generated a quantity of NMC Hydroxide at least approximately equivalent to the total acid added and generated upstream in the process.

The pregnant liquor was then fed to an Evaporative Crystallization Circuit that was operated under vacuum to flash cool the solution to 30° C. As the solution was flash cooled, more water was evaporated, forcing a nickel sulfate hydrated salt to crystallize out of solution. The crystals were discharged from the crystallizer and fed to a centrifuge where they were dewatered and washed. The cake was discharged into a tank, where it was re-dissolved using hot condensate from the evaporator/crystallizer to a target concentration of 120 g/L of nickel.

The impurities that accumulated in the Nickel Sulfate Crystallization mother liquor were controlled via a process bleed which was monitored and purged to ensure that crystallized solids product requirements were achieved.

Nickel Hydroxide Precipitation

The process bleed from Nickel Sulfate Crystallization Circuits was used to provide nickel as the pre-loading agent in the Co/Mn Solvent Extraction Circuit. The nickel was loaded onto the stripped organic extractant to an extent, and supplemented with potassium hydroxide (as described above).

The raffinate from the Pre-Load Step was fed to the Nickel Precipitation Circuit where potassium hydroxide was added to operate at pH of 8 which facilitated the precipitation of Nickel as a Hydroxide. The circuit consisted of reactor train followed by a filtration unit. The filtrate and wash from filter were transferred downstream to the Potassium Sulfate Production process.

The cake product from the filtration unit consisted mainly of Nickel Hydroxide and was used as a neutralization agent for Iron Removal Circuit to reduce the addition of potassium into the main process loop and improve the single pass conversion in the Nickel Sulfate Crystallization Circuit.

Example 4

In an embodiment of the process described herein, the following describes another hydrometallurgical process for the recovery of a nickel, cobalt, and manganese sulfate solution produced from a NMC-containing feedstock using Ni/Co/Mn crystallization. Particularly, the following describes a process involving a matte leaching stage, with NMC crystallization selective (or not) over potassium. The major process steps involved are depicted in the block-flow diagram of FIG. 5.

Matte Leach

The raw matte feedstock containing (by weight) copper—32.2%, nickel—40.7%, iron—5%, cobalt—3.6% and Sulfur—18.3% was fed to a Grinding Circuit at a feed rate of about 19.5 metric tonnes per hour. The resultant ground matte slurry was fed to a reactor train operating at 85° C. at atmospheric conditions, where it was mixed with spent electrolyte from the downstream Copper Electrowinning process. Oxygen was sparged into initial reactor tanks which promotes leaching of the matte. The nickel in the matte, which primarily exists as heazlewoodite ($Ni_3S_2$), reacted with the spent electrolyte and oxygen to form nickel sulfate in solution and some millerite (NiS) solids. No additional oxygen was introduced in the final tanks within the reactor train which facilitated the metathesis reactions between the copper sulfate present in the spent electrolyte, copper leached from the initial reactors tanks and the remaining nickel present as $Ni_3S_2$ to predominantly solubilize as nickel sulfate while generating mainly copper sulfide. The nickel rich solution was then separated from the remaining matte via a filtration step and proceeded to the Iron Removal Circuit. The remaining matte was sent to pressure oxidative leaching.

Pressure Oxidative Leaching

The matte was mixed with spent electrolyte from electrowinning and concentrated sulfuric acid in an autoclave operating at 600 kPa and 150° C. Oxygen and cooling water were added directly to the autoclave. After leaching, any residue remaining was separated via a filtration step and sent to the PGM refinery. The copper-rich filtrate was purified and cooled before proceeding to copper electrowinning.

Copper Removal Circuit

Electrowinning

The copper-rich filtrate from the Pressure Oxidative Leaching Circuit is fed to the tankhouse where copper cathode material is produced. The spent electrolyte is recycled back to the atmospheric and pressure leach circuits.

Iron Removal

Iron Precipitation Circuit

The nickel-rich solution from the Atmospheric Leach was fed to reactor train, where Ni/Mn/Co hydroxide produced downstream were used as the primary neutralization agents to raise the pH to about 4 to 5.5, where potassium hydroxide was used to supplement. The reactors were air sparged to ensure all iron was oxidized to the ferric form. At these conditions most of the iron was precipitated from the liquor, while the nickel, manganese and cobalt hydroxides were almost completely converted back to metal sulfates.

The resultant slurry was fed to a thickener, where the underflow slurry was pumped to a bank of filter presses where mainly iron hydroxide residue was separated and transferred to a re-leach process step. The polished filtrate was combined with the thickener overflow and fed onwards to the Impurity Ion Exchange Circuit.

In the re-leaching step, the residue cake was mixed with a sulfuric acid solution which drops the pH to about 1.5 to dissolve any residual Nickel and Co/Mn Hydroxide solids present in the cake. Within the same reactor train the system was basified using potassium hydroxide to increase the pH to about 5.5 to facilitate the re-precipitation of iron. The resultant slurry was subsequently fed to a filter press where the cake was removed as a residue from the process and the filtrate was recovered back into the process to the Nickel Hydroxide Precipitation Circuit.

Impurity Removal Circuit

Impurity Ion Exchange Circuit

Purpose of Impurity Ion Exchange Circuit was to remove residual Copper, Zinc, Iron, and other metal impurities from the NMC-rich liquor prior to NMC Crystallization.

The Ion Exchange columns were packed with Lewatit VP OC 1026 or an equivalent ion exchange resin which released hydrogen ions as copper, and other impurities were loaded from the NMC-rich solution. The NMC-rich raffinate solution was then fed to the NMC Crystallization Circuit. A sulfuric acid solution was used to elute the loaded copper from the saturated resin which was recycled upstream to the PDX Leaching Circuit.

NMC Crystallization

The NMC rich effluent from the Impurity Ion Exchange Circuit was acidified using sulfuric acid to a pH of 1 prior to feeding the NMC Crystallization Circuit.

The circuit consisted of a forced circulation (FC) evaporative crystallizer where flash vapor produced was compressed by a mechanical vapor recompression (MVR) fan. The compressed vapor provided the heat to drive evaporation in the unit that operated at 80° C. Water was flashed in the evaporator to concentrate the solution and achieve a single pass conversion of nickel, manganese and cobalt that was at least approximately equivalent to the acid generated upstream in the process.

The pregnant liquor was then fed to an Evaporative Crystallization Circuit that was operated under vacuum to flash cool the solution to 30° C. As the solution was flash cooled, more water was evaporated, forcing a mixed nickel, manganese and cobalt sulfate hydrated salt to crystallize out of solution. The crystals were discharged from the crystallizer and fed to a centrifuge where they were dewatered and washed. The cake was discharged into a tank, where it was re-dissolved using hot condensate from the evaporator/crystallizer to a target concentration of 120 g/L (Ni+Mn+Co).

The impurities that accumulated in the NMC Crystallization mother liquor were controlled via a process bleed which was monitored and purged to ensure that crystallized solids product requirements were achieved.

Nickel, Manganese, Cobalt (NMC) Precipitation

The process bleed from NMC Sulfate Crystallization Circuit was fed to the NMC Hydroxide Precipitation Circuit where potassium hydroxide was added to operate at pH of 8.5 which facilitated the precipitation of NMC Hydroxides. The circuit consisted of reactor train followed by a filtration unit. The filtrate and wash from the filter were transferred downstream to a Potassium Sulfate Production process.

The cake product from the filtration unit consisted mainly of NMC Hydroxides which was used as a neutralization agent for Iron Removal Circuit to reduce the addition of potassium into the main process loop and improve the single pass conversion in the NMC Crystallization Circuit.

Example 5

In an embodiment of the process described herein, the following describes another hydrometallurgical process for the recovery of a cobalt sulfate solution produced from a cobalt-containing feedstock using cobalt crystallization. Particularly, the following describes a process involving a pressure oxidation stage, with Co crystallization. The major process steps involved are depicted in the block-flow diagram of FIG. 7.

Process Description

The purpose of this section is to describe the process to produce Cobalt Sulfate ($CoSO_4.7H_2O$) from a Cobalt Concentrate.

Pressure Oxidative Leaching

A cobalt sulfide concentrate with an approximate composition (by weight) of cobalt—2.5%, iron—28%, arsenic-30%, magnesium-1.8%, copper—0.6% and sulfur—18% and mass feed rate of about 9.5 t/h was repulped and pumped to the pressure oxidation circuit as a slurry. In the autoclave unit, high pressure steam for preheating, and oxygen were used to oxidize the cobalt sulfide concentrate to cobalt sulfate at a temperature of 200° C. Most of the iron was oxidized to ferric and precipitated. The slurry was flashed cooled to atmospheric conditions where the flash vapor was sent to heat recovery and a venturi scrubber. The cooled slurry was pumped onwards to Iron Precipitation 1.

Iron Precipitation 1

In this stage, the excess acid in the pressure leach discharge was fed to a reactor train, where cobalt hydroxide produced downstream was used as the neutralization agent to achieve a target pH of 2.5. The resulting slurry was thickened, and the underflow was filtered, and the separated residue was removed from the process. The thickener overflow and filtrate were combined and fed to Copper Cementation.

Copper Cementation

The leachate proceeded to Cu cementation, where iron powder was added to cement copper. Sulfuric acid was dosed to control the pH to approximately 3. The iron powder reacted with copper sulfate in the solution to form iron (II) sulfate and precipitated the copper. The slurry was then filtered to remove the copper cementate, while the filtrate proceeded to Iron Precipitation 2.

Iron Precipitation 2 In this stage, filtrate from the Copper Cementation process was fed to a reactor train, where air was sparged to oxidize iron, and cobalt hydroxide produced downstream was added to facilitate the precipitation of arsenic as stable scorodite, which was removed by thickening and filtration. The overflow and filtrate passed to another set of reactors where again cobalt hydroxide produced downstream was used as the primary neutralization agent, and supplemented with sodium hydroxide to raise the pH to about 5 (4.5 to 5.5). Air was further sparged to ensure all iron was oxidized to the ferric form. At these conditions most of the iron and aluminum were precipitated from the liquor, while the cobalt hydroxide was almost completely converted back to cobalt sulfate.

The resultant slurry was fed to a thickener, where the underflow was pumped back upstream to the Iron Precipitation 1 Circuit.

The thickener overflow was fed to a polishing filter to remove any residual fine solids prior to being sent to the Copper Ion Exchange (IX) Circuit.

Copper Ion Exchange

Residual copper remaining in the thickener overflow from Iron Precipitation 2 was fed to the copper Ion Exchange columns which were packed with Lewatit VP OC 1026, or an equivalent ion exchange resin which has a high copper affinity. Copper and other trace impurities metals loaded onto the resin at these conditions, while the cobalt rich solution passed through the circuit onwards to the Zinc Sulfide Precipitation Circuit. A sulfuric acid solution was used to elute the loaded copper from the saturated resin which was recycled upstream to Iron Precipitation 1 for copper recovery.

Zinc Sulfide Precipitation

The cobalt-rich copper ion exchange effluent was fed to a reactor train where sodium hydrosulfide (NaHS) was added to precipitate zinc from the solution as a zinc sulfide product which was filtered, washed and bagged. The filtrate was then fed to the Cobalt Crystallization Circuit.

Cobalt Crystallization

The cobalt-rich solution from Zinc Sulfide Precipitation first entered an evaporator to concentrate it, then a crystallizer to crystallize out a hydrated cobalt sulfate product in the crystallizer slurry and separate the mother liquor. The slurry was cycloned and centrifuged to remove as much remaining solution as possible, then the product cake was dried and packaged for shipment.

The impurities that accumulated in the Cobalt Crystallization mother liquor were controlled via a process bleed which was monitored and purged to ensure that crystallized solids product requirements were achieved.

Cobalt Hydroxide Precipitation

The bleed stream from the crystallization circuit contained cobalt sulfate at the saturation concentration. This was fed to the cobalt hydroxide precipitation step where NaOH was added to increase the pH to 8 and precipitate the cobalt sulfate contained in the solution to cobalt hydroxide. It also generated soluble sodium sulfate.

The cake product from the filtration unit which consisted of mainly cobalt hydroxide was used as a neutralization agent for the upstream Iron Precipitation Circuits (1 and 2) to reduce the addition of sodium into the main process loop and improve the single pass conversion in the Cobalt Crystallization Circuit.

The cobalt hydroxide filtrate was fed to a magnesium removal stage where sodium hydroxide was added to precipitate magnesium as a hydroxide which was then filtered and washed to separate as a solid residue. The filtrate was sent to the sodium sulfate recovery plant.

Example 6

In an embodiment of the process described herein, the following describes a case study that was completed to illustrate economic improvements of the process as described herein when compared to a typical battery chemical refining flowsheet. The case study considered the development of a nickel and cobalt sulfate refinery with a design capacity of 40,000 tonnes of nickel per year. Capital and operating costs were developed based on process modelling and engineering design at an Association for the Advancement of Cost Engineering (AACE) Class 4 level. The capital cost estimate considered equipment supply and install costs, discipline costs, supporting infrastructure and roads, indirect costs associated with construction, owner's costs and contingency. No costs associated with construction of rail lines, long-term warehousing of product or the development of a port were considered. A financial analysis was then conducted to evaluate the economic value of the herein described process.

Two variants of a typical battery chemical refinery were considered in the case study: Typical—Case 1: Sodium hydroxide was used as the neutralizing agent, producing sodium sulfate as a by-product. Typical—Case 2: Ammonia was used as the neutralizing agent, producing ammonium sulfate as a by-product.

Three variants of the process described herein were considered in the case study: Case A—The base process where Ni SX was eliminated, particularly involving a Matte/MSP/MHP type feedstock containing Ni and Co, with Ni crystallization and Co SX (a variant of the process described in Example 3). Case B: Same as Case A, but with Co SX also eliminated; particularly involving a Matte/MSP/MHP type feedstock containing Ni and Co, Ni & Co crystallization, with NaOH (a variant of the process described in Example 4). Case C: Same as Case A, but where potassium hydroxide was used as the neutralizing agent and therefore potassium sulfate was produced as a by-product; particularly involving Matte/MSP/MHP type feedstock containing Ni and Co, Ni crystallization and Co crystallization with KOH (a variant of the process described in Example 3).

Table 4.0 lists the assumptions that formed the basis of the case study. Note that the price of sodium sulfate was assumed to be zero due to the challenges associated with its sale. Table 5.0 summarizes outcomes of the comparison. For typical flowsheets, operating costs were about 30% lower when ammonia was used instead of sodium hydroxide based on reagent cost assumptions. Combined with additional revenue assumed for the ammonium sulfate, this more than offset additional capital required to store liquid ammonia on site and resulted in an additional ~300 million of NPV and ~3% IRR.

TABLE 4.0

Major assumptions for the comparison of the herein described Process to a typical battery chemical refining flowsheet

| Parameter | Value |
| --- | --- |
| Refinery Design Basis | |
| Refinery Operating Life (years) | 30 |
| Refinery Operating Factor (%) | 91.3 |
| Refinery Ramp-Up (%) | Year 1 = 50%, Year 2 = 80%, Year 3+ = 100% |
| Refinery Design Capacity (tonnes Ni/year) | 40,000 |

TABLE 4.0-continued

Major assumptions for the comparison of the herein described Process to a typical battery chemical refining flowsheet

| Parameter | Value |
| --- | --- |
| Refinery Feed Material | Nickel matte |
| Payability Factor for Contained Metals (%) | 85 |
| Nickel Grade (%) | 42 |
| Copper Grade (%) | 32 |
| Cobalt Grade (%) | 3 |
| PGM Content | Ignored |
| Major Unit Prices (USD/tonne) | |
| Copper Cathode (Sub-LME Grade A) | 6,670 |
| Battery Grade Nickel Sulfate (USD per tonne Ni) | 21,250 |
| Battery Grade Cobalt Sulfate (USD per tonne Co) | 51,000 |
| Sulfuric Acid (98%) | 65 |
| Sodium Hydroxide (50%) | 400 |
| Ammonia | 530 |
| Sodium Sulfate | 0 |
| Ammonium Sulfate | 90 |
| Potassium Sulfate | 650 |
| Economic Analysis Parameters | |
| Owner's Cost Factor | 8% of Project Direct Costs |
| Contingency on Total Capital Cost | 35% |
| Discount Rate (%) | 12 |

TABLE 5.0

Engineering and economic comparison of typical and herein described Processes.

| Parameter | Typical Case 1 | Typical Case 2 | Case A | Case B | Case C |
| --- | --- | --- | --- | --- | --- |
| Capital Cost (M USD) | 990 | 1020 | 775 | 640 | 775 |
| Operating Cost (M USD/year) | 134 | 91 | 67 | 57 | 85 |
| Neutral Salt By-Product | $Na_2SO_4$ | $(NH_4)_2SO_4$ | $Na_2SO_4$ | $Na_2SO_4$ | $K_2SO_4$ |
| Neutral Salt Production (tonne/year) | 132,000 | 123,000 | 22,000 | 18,000 | 29,000 |
| By-Product Revenue (M USD) | none | 11 | none | none | 19 |
| Simple Payback Period (years) | 5.2 | 4.2 | 3.0 | 1.7 | 3.0 |
| Pre-Tax $NPV_{12}$ (M USD) | 250 | 560 | 840 | 1,010 | 840 |
| Pre-Tax IRR (%) | 15.5 | 19.2 | 25.5 | 30.8 | 25.5 |

Compared to Case 2, the next best alternative, the herein described Process (Case A) reduced capital costs associated with the refinery by 215 M USD, while also reducing operating costs by 67 M USD/year. As mentioned above, these savings were largely driven by elimination of the nickel SX circuit and its associated costs. As such, plant payback was reduced from 5.2 years to 3.0 years, and the pre-tax internal rate of return was improved by ~10%.

When the cobalt SX circuit was also removed (as per Case B) to produce a combined nickel-cobalt sulfate product, the business case was further improved, with an additional 135 M USD of capital cost savings and 10 M USD/year operating cost savings that resulted in a payback period of 1.7 years and additional improvement in the pre-tax internal rate of return by ~5%.

Use of potassium hydroxide (Case C), despite its high reagent cost, was found as a viable solution to avoid producing sodium sulfate. Although it didn't substantially change the business case, it eliminated the issues associated with sodium sulfate product disposal and contributed to a circular economy by producing potassium sulfate, a high value fertilizer.

Reduction in LIB costs will accelerate adoption of EVs required to limit climate change. The process described herein was found to reduce the costs associated with nickel and cobalt battery chemicals, two major cost contributors for LIBs.

The process achieved its cost savings by eliminating SX circuit(s) included in current battery chemical flowsheets and replacing it with a crystallization circuit, thereby simplifying process complexity and reducing reagent consumption. As an additional benefit, the process was also found to reduce the production of the environmentally problematic sodium sulfate by-product by >80%. The analysis completed on the herein described Process was supported by integrated process modelling and laboratory-scale testwork.

Example 7

In an embodiment of the process described herein, the following describes another hydrometallurgical process for the recovery of a nickel and cobalt sulfate solution produced from a nickel and cobalt containing feedstock using Ni/Co crystallization. Particularly, the following describes a process involving a mixed sulfide precipitate leaching stage, with Ni/Co crystallization. The major process steps involved are depicted in the block-flow diagram of FIG. 6.

Pressure Oxidative Leaching

A Nickel and Cobalt Sulfide precipitate (MSP) feedstock was re-pulped and fed to a Grinding Circuit prior to being pumped to Pressure Oxidative Leaching. The circuit consisted of an autoclave that operated at high pressure and temperature (165° C.) with the addition of high purity oxygen that solubilized the nickel and cobalt sulfides, along with some impurities. The acidic discharge liquor was flash cooled to atmospheric conditions prior to feeding an Iron Removal/Precipitation Circuit.

Iron Removal

Iron Precipitation Circuit

The flash cooled slurry from the Pressure Oxidative Leaching Circuit was fed to a reactor train, where nickel and cobalt hydroxide produced downstream were used as the primary neutralization agent to react with free acid, iron, and aluminum sulfate present. The reactors were air sparged to ensure all iron was oxidized to the ferric form. At these conditions most of the iron and aluminium were precipitated from the liquor, while the nickel and cobalt hydroxides were almost completely converted back to metal sulfates.

The resultant slurry was fed to a thickener, where the underflow slurry was pumped to a bank of filter presses where mainly iron and aluminium hydroxide residue was separated and transferred to a re-leach process step. The polished filtrate was combined with the thickener overflow and pre-conditioned with some dilute sulfuric acid to a target pH of 4 prior to being fed to the Nickel & Cobalt Crystallization Circuit.

In the re-leaching step, the residue cake was mixed with a sulfuric acid solution which drops the pH to about 1.5 to dissolve any residual Nickel and Cobalt Hydroxide solids present in the cake. Within the same reactor train the system was basified using potassium hydroxide to increase the pH to about 5.5 to facilitate the re-precipitation of iron and aluminum. The resultant slurry was subsequently fed to a filter press where the cake was removed as a residue and the filtrate was recovered back into the process to the Nickel & Cobalt Precipitation Circuit.

Nickel and Cobalt Crystallization Circuit

Purpose of the Nickel and Cobalt Crystallization Circuit was to purify the nickel and cobalt rich sulfate by crystallizing them out of solution while leaving behind residual impurities in the mother liquor.

The circuit consisted of a forced circulation (FC) evaporative crystallizer where flash vapor produced was compressed by a mechanical vapor recompression (MVR) fan. The compressed vapor provided the heat to drive evaporation in the unit that operated at 80° C. Water was flashed in the evaporator to concentrate the solution and achieve a single pass conversion of combined nickel and cobalt that is least approximately equivalent to the acid generated upstream in the process.

The slurry from the crystallizer was discharged to a primary centrifugation step where the product cake was washed. A portion of the centrate was recirculated back to the evaporative crystallizer and the elutriation leg to dilute the solids concentration in the discharge slurry. The remaining centrate was fed to a set of vacuum flash crystallisers which gradually reduced the temperature to 30° C. As the solution was flash cooled, more water was evaporated which facilitated the crystallization of additional nickel and cobalt as hydrated sulfates while leaving the primary impurities predominantly in the mother liquor.

The resulting slurry was fed to the secondary centrifuge step where the product cake was washed prior to being combined with the primary product cake solids. The product cake was re-dissolved with demineralized water and pumped to the cathode production facility. The secondary centrate liquor was then fed to a polishing filtration step to remove any fine particulates prior to feeding a downstream Copper Removal Circuit.

Copper Removal Circuit

The bleed from the Nickel and Cobalt Crystallization circuit was fed to a cementation process where nickel powder and sulfuric acid were added which facilitated the precipitation of copper metal while resolubilizing most of the nickel powder to nickel sulfate. The resulting mixture was fed to a filter press where the copper cake was washed and discharged to Product Storage. The filtrate containing the NMC rich solution was fed to a polishing filtration step prior to feeding a Zinc/Impurity Solvent Extraction Circuit.

Zinc/Impurity Solvent Extraction (SX) Circuit

The purpose of Zinc SX was to selectively remove zinc from the nickel and cobalt rich bleed liquor.

The organic extractant used in this SX circuit was commercially available Cyanex 272 (Bis(2,4,4 Trimethlpentyl) Phosphenic Acid) diluted in a high flash point aliphatic solvent. The polished filtrate solution from the Copper Removal Circuit was pre-conditioned with sulfuric acid to reduce the pH to 3 prior to extraction.

In extraction, zinc as well as some residual impurities were extracted on the organic extractant. The loaded organic extractant was then scrubbed to remove mainly cobalt that was weakly affiliated to the media. Zinc was stripped from the organic with a sulfuric acid solution. A portion of the zinc-rich strip solution was then used for scrubbing with the balance being directed to organic treatment to reduce residual organics to less than 1 ppmv prior to being directed to the Zinc/Impurity Precipitation where potassium hydroxide was added to precipitate a zinc hydroxide intermediate product. The nickel and cobalt rich raffinate stream from extraction were also fed to an organic treatment step prior to advancing onwards to the Nickel and Cobalt Precipitation Process.

Nickel and Cobalt Precipitation Circuit

The nickel and cobalt rich raffinate from the Zinc/Impurity SX was fed to the Nickel and Cobalt Precipitation Circuit where potassium hydroxide was added to operate at pH of approximately 8 which facilitated the precipitation of Nickel and Cobalt as Hydroxides. The circuit consisted of a reactor train followed by a filtration unit. The filtrate and wash from the filter press were transferred downstream to the Potassium Sulfate Production process. The washed cake product from the filter press consisted of the nickel and cobalt hydroxides which were used as the neutralization agent for the Iron Removal/Precipitation Circuit upstream to reduce the addition of potassium into the main process loop and improve the single pass conversion in the Nickel and Cobalt Crystallization Circuit.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

As used in the specification and claims, the singular forms "a", "an" and "the" include plural references unless the context clearly dictates otherwise. The term "comprising" as used herein will be understood to mean that the list following is non-exhaustive and may or may not include any other additional suitable items, for example one or more further feature(s), component(s) and/or ingredient(s) as appropriate.

As used herein, "NMC" refers to nickel, manganese, and/or cobalt. For example, NMC sulfates refers to nickel sulfate, manganese sulfate, and/or cobalt sulfate. As used herein, "metal sulfates" refers to any one or combination of nickel sulfate, cobalt sulfate, and/or manganese sulfate. Further, "metal hydroxides" refers to any one or combination of nickel hydroxide, cobalt hydroxide, and/or manganese hydroxide.

As used herein, "crystallization", "crystallizing", or "crystallized" refers to the process of forming a crystal network that selectively and slowly formed from metal sulfates in a PLS, resulting in a pure crystalline compound (at least as indicated by x-ray diffraction). In contrast, as used herein, "precipitation" refers to a process characterized by the addition of a basification reagent and the formation of a crystalline or amorphous solid from solution. As used herein, "co-crystallize" or "co-crystallizing" refers to crystallizing two or more components (e.g., metal sulfates, impurities, etc.) out of solution together (e.g., at the same time). Used herein, when referencing "selectively crystallizing" or "selectively co-crystallizing" metal sulfates, "selective" refers to crystallizing the metal sulfate away from most, if not all impurities or other components; in other words, "selective" refers to forming a pure, crystallized metal sulfate.

Used herein, when referencing "selectively precipitated" basic metal salts, e.g., metal hydroxides, "selective" refers to precipitating the basic metal salt away from most, if not all impurities or other components; in other words, "selective" refers to forming a pure basic metal salt.

Used herein, "an amount of acid to be neutralized upstream of crystallizing the metal sulfate" refers to: (i) neutralizing acid that has been added into the process upstream of crystallizing the metal sulfate (e.g., in a leaching stage and/or a refining stage(s)); (ii) neutralizing acid that is generated during a refining stage to remove an impurity and/or a component; or (iii) a combination of both. The amount of acid that has been added, or generated will depend on the conditions of the leaching stage and/or refining stage(s), and would be determinable in view of the feedstock being used and the known impurities and components thereof, the refining stages being used to process the pregnant leach solution generated from the leaching stage, and the chemical reactions/processes and stoichiometry thereof for each of the leaching and refining stages.

Used herein, "free water" refers to the water that makes up the liquid phase of an aqueous solution that is not part of a hydration sphere and/or has not been incorporated into a lattice structure. "Amount of free water" refers to the volume (e.g., mL, L) of free water that is present in the aqueous solution.

What is claimed is:

1. A process for generating a metal sulfate, the process comprising:
   crystallizing a metal sulfate from an aqueous solution to form a crystallized metal sulfate in a mother liquor, the mother liquor comprising an uncrystallized metal sulfate;
   separating the crystallized metal sulfate from the mother liquor; and
   basifying a portion of the mother liquor to convert the uncrystallized metal sulfate to a basic metal salt.

2. The process of claim 1, further comprising refining the aqueous solution upstream of crystallizing the metal sulfate.

3. The process of claim 1, further comprising leaching a feedstock to form the aqueous solution comprising the metal sulfate, wherein:
   the feedstock comprises material derived from recycled lithium ion batteries or lithium ion battery manufacturing scrap; and
   crystallizing the metal sulfate further comprises bleeding the mother liquor and controlling the bleed rate to selectively inhibit crystallizing a lithium impurity when crystallizing the metal sulfate.

4. The process of claim 1, wherein the crystallized metal sulfate is a battery-grade crystallized metal sulfate, or an electroplating-grade crystallized metal sulfate.

5. A process for generating a crystallized metal sulfate, the process comprising:
   leaching a feedstock to form a pregnant leach solution, the pregnant leach solution comprising a metal sulfate;
   crystallizing the metal sulfate from the pregnant leach solution to form a crystallized metal sulfate in a mother liquor, the mother liquor comprising an uncrystallized metal sulfate;
   separating the crystallized metal sulfate from the mother liquor;
   basifying a portion of the mother liquor to convert the uncrystallized metal sulfate to a basic metal salt; and
   using the basic metal salt as a first neutralizing agent upstream of crystallizing the metal sulfate, converting the basic metal salt back to the uncrystallized metal sulfate;
   wherein the crystallized metal sulfate is a battery-grade crystallized metal sulfate.

6. The process of claim 5, wherein the feedstock comprises any one or combination of mixed hydroxide precipitates, mixed sulfide precipitates, nickel sulfide concentrate, cobalt sulfide concentrate, nickel laterite, nickel matte, ferronickel, material derived from recycled lithium ion batteries or lithium ion battery manufacturing scrap, or spent cathode material.

7. The process of claim 5, further comprising refining the pregnant leach solution upstream of crystallizing the metal sulfate.

8. The process of claim 7, wherein refining the pregnant leach solution comprises subjecting the pregnant leach solution to at least one component removal stage to remove one or more impurities or components from the pregnant leach solution.

9. The process of claim 8, wherein the at least one component removal stage comprises precipitation, atmospheric or pressure leaching, sulfidation, solvent extraction, ion exchange, cementation, or a combination thereof.

10. The process of claim 8, wherein the impurities comprise sodium, aluminum, iron, copper, zinc, lithium, cobalt, manganese, and combinations thereof; and the components comprise any one or two of nickel, cobalt, and manganese.

11. The process of claim 5, wherein basifying the portion of the mother liquor comprises using a second neutralizing agent to convert the uncrystallized metal sulfate to the basic metal salt, wherein the second neutralizing agent is any one or combination of sodium hydroxide, potassium hydroxide, calcium hydroxide, lithium hydroxide, and magnesium oxide.

12. The process of claim 11, wherein when the second neutralizing agent is sodium hydroxide, and the sodium hydroxide is converted to sodium sulfate when converting the uncrystallized metal sulfate to the basic metal salt.

13. The process of claim 12, further comprising converting the sodium sulfate back to the sodium hydroxide by electrolysis.

14. The process of claim 11, wherein using the any one or combination of potassium hydroxide, calcium hydroxide, lithium hydroxide, or magnesium oxide as the second neutralizing agent forms any one or combination of potassium sulfate, calcium sulfate, lithium sulfate, or magnesium sulfate as a by-product.

15. The process of claim 5, further comprising crystallizing the uncrystallized metal sulfate.

16. The process of claim 5, wherein crystallizing the metal sulfate comprises introducing the pregnant leach solution into a first crystallizer and operating the first crystallizer under conditions to form the crystallized metal sulfate.

17. The process of claim 16, wherein the conditions to form the crystallized metal sulfate comprise one or more of bleeding the mother liquor from the first crystallizer and controlling the bleed rate, and
controlling an amount of free water in the first crystallizer, to selectively inhibit crystallizing an impurity when crystallizing the metal sulfate.

18. The process of claim 17, wherein the impurity comprises lithium, sodium, potassium, or magnesium.

19. The process of claim 16, further comprising:
dissolving the crystallized metal sulfate in an aqueous solution to form an aqueous sulfate solution;
introducing the aqueous sulfate solution into a second crystallizer; and
operating the second crystallizer under conditions to reform the crystallized metal sulfate from the aqueous metal sulfate solution.

20. The process of claim 5, wherein the metal sulfate is any one or combination of nickel sulfate, cobalt sulfate, or manganese sulfate.

21. The process of claim 20, wherein crystallizing the metal sulfate comprises selectively crystallizing any one or more of the nickel sulfate, manganese sulfate, and cobalt sulfate from the pregnant leach solution.

22. The process of claim 5, wherein the basic metal salt comprises a metal hydroxide.

23. The process of claim 22, wherein the metal hydroxide comprises any one or a combination of nickel hydroxide, cobalt hydroxide, or manganese hydroxide.

24. The process of claim 5, wherein:
the feedstock comprises material derived from recycled lithium ion batteries or lithium ion battery manufacturing scrap;
the crystallized metal sulfate comprises nickel sulfate, cobalt sulfate, and manganese sulfate;
the basic metal salt comprises nickel hydroxide, cobalt hydroxide and manganese hydroxide; and
crystallizing the metal sulfate comprises introducing the pregnant leach solution into a crystallizer and operating the crystallizer under conditions to form the crystallized metal sulfate,
the conditions comprising bleeding the mother liquor from the crystallizer and controlling the bleed rate to selectively inhibit crystallizing a lithium impurity when crystallizing the metal sulfate.

25. The process of claim 24, wherein crystallizing the metal sulfate is performed at a pH level in a range of 1.5-2.5.

26. The process of claim 24, wherein basifying the portion of the mother liquor comprises adding a second neutralizing agent that comprises a hydroxide of an alkali metal or alkaline earth metal.

27. The process of claim 26, wherein adding the second neutralizing agent increases pH to a level in a range of 7.5-9.5.

28. The process of claim 24, wherein crystallizing the metal sulfate further comprises adding sulfuric acid to the pregnant leach solution.

29. The process of claim 24, wherein the conditions to form the crystallized metal sulfate further comprise evaporating an amount of water from the pregnant leach solution that is less than the amount of water to be evaporated to reach a saturation point for the lithium impurity and/or a sodium impurity.

30. The process of claim 29, wherein the lithium impurity is $Li_2SO_4$ and the sodium impurity is $Na_2SO_4$.

31. The process of claim 24, wherein basifying the portion of the mother liquor to convert the uncrystallized metal sulfate to the basic metal salt further comprises removing the basic metal salt from the mother liquor and forming a cake of the basic metal salt.

32. The process of claim 31, wherein using the basic metal salt as a first neutralizing agent upstream comprises using a first part of the cake when leaching the feedstock and a second part of the cake in a refining stage.

33. The process of claim 32, wherein the first part is 0-40% by weight of the cake.

34. The process of claim 32, wherein the second part is 60-100% by weight of the cake.

35. The process of claim 34, wherein the feedstock comprises by weight at least 50% recycled lithium ion battery materials and/or lithium ion battery manufacturing scrap.

* * * * *